United States Patent
Matsuda

(10) Patent No.: US 7,707,567 B2
(45) Date of Patent: Apr. 27, 2010

(54) INFORMATION PROCESSING METHOD, INFORMATION-PROCESSING APPARATUS, RECORDING MEDIUM, AND PROGRAM

(75) Inventor: Kouichi Matsuda, Tokyo (JP)

(73) Assignee: Sony Corporation, Tokyo (JP)

(*) Notice: Subject to any disclaimer, the term of this patent is extended or adjusted under 35 U.S.C. 154(b) by 896 days.

(21) Appl. No.: 11/531,609

(22) Filed: Sep. 13, 2006

(65) Prior Publication Data

US 2007/0061602 A1 Mar. 15, 2007

(30) Foreign Application Priority Data

Sep. 14, 2005 (JP) ............................ P2005-267168

(51) Int. Cl.
G06F 9/45 (2006.01)
(52) U.S. Cl. ..................................... 717/156
(58) Field of Classification Search ................ 717/100, 717/154–157
See application file for complete search history.

(56) References Cited

U.S. PATENT DOCUMENTS

| | | | |
|---|---|---|---|
| 4,898,921 A | 2/1990 | Humphrey et al. | |
| 5,761,493 A | 6/1998 | Blakeley et al. | |
| 6,353,896 B1 | 3/2002 | Holzmann et al. | |
| 7,210,117 B2* | 4/2007 | Kudukoli et al. | 717/100 |
| 7,583,397 B2* | 9/2009 | Smith | 358/1.15 |
| 2007/0168907 A1* | 7/2007 | Iborra et al. | 717/100 |
| 2007/0169053 A1* | 7/2007 | Kodosky et al. | 717/155 |
| 2007/0266329 A1* | 11/2007 | Gaudette | 715/763 |

FOREIGN PATENT DOCUMENTS

| | | |
|---|---|---|
| JP | 06-110767 | 4/1994 |
| JP | 07-168709 | 7/1995 |
| JP | 07-219754 | 8/1995 |
| JP | 11-24900 | 1/1999 |
| JP | 11-24902 | 1/1999 |
| JP | 11-134180 | 5/1999 |
| JP | 11-338684 | 12/1999 |
| JP | 2000-181750 | 6/2000 |
| JP | 2002-261917 | 9/2002 |

OTHER PUBLICATIONS

Virine et al. "Visualization of Probabilistic Business Models", Dec. 2003, winter Simulation Conference, pp. 1779-1786.*
Lavazza et al. "Combining UML and formal notations for modellign real-time systems", Sep. 2001, ACM, pp. 196-206.*

* cited by examiner

*Primary Examiner*—Anna Deng
(74) *Attorney, Agent, or Firm*—K&L Gates LLP

(57) ABSTRACT

An information-processing method usable by an information-processing apparatus is provided. The information-processing-apparatus is used for editing state-transition information usable to construct a state-transition diagram including information on the operation in each of states, information on events each possibly occurring in each specific one of the states to result in a transition, and information on transition directions each indicating the direction of a transition caused by each of the events possibly occurring in the states. The method includes searching for a hardware event not assigned yet as any one of the events, assigning a hardware are event found in a search process carried out at the searching step as a shortcut event if the events include the software event, generating the state-transition diagram on the basis of the state-transition information, and displaying the state-transition diagram.

9 Claims, 17 Drawing Sheets

```
1  <events>
2   <mapping>
3    <software event>SWITCH_ON</software>
4    <hardware event>KEY_PRESS $)</hardware>
5   </mapping>
6  </events>
```

FIG.15
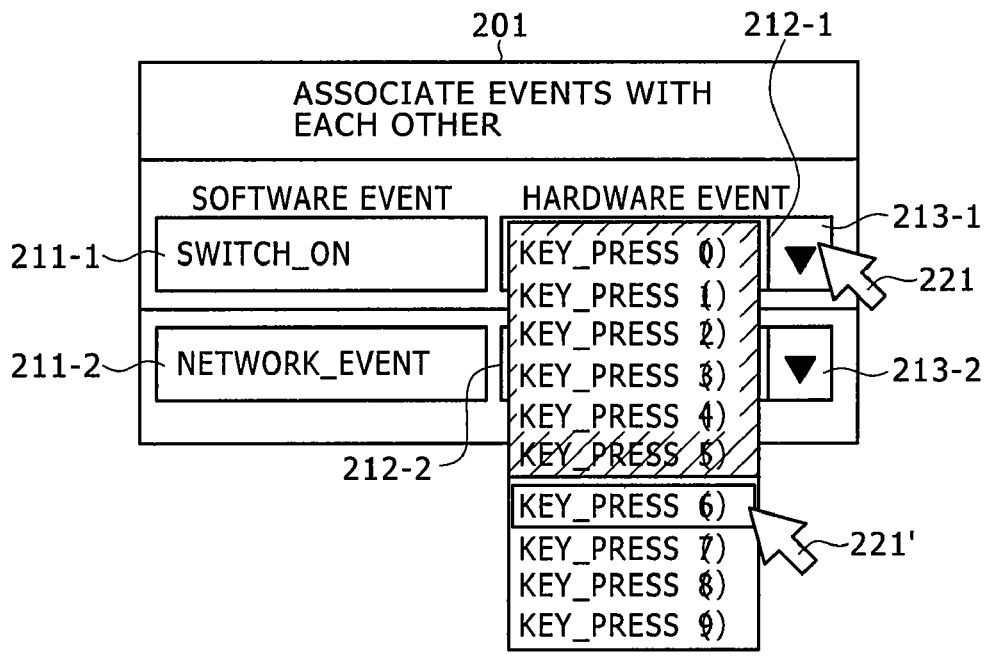
FIG.16
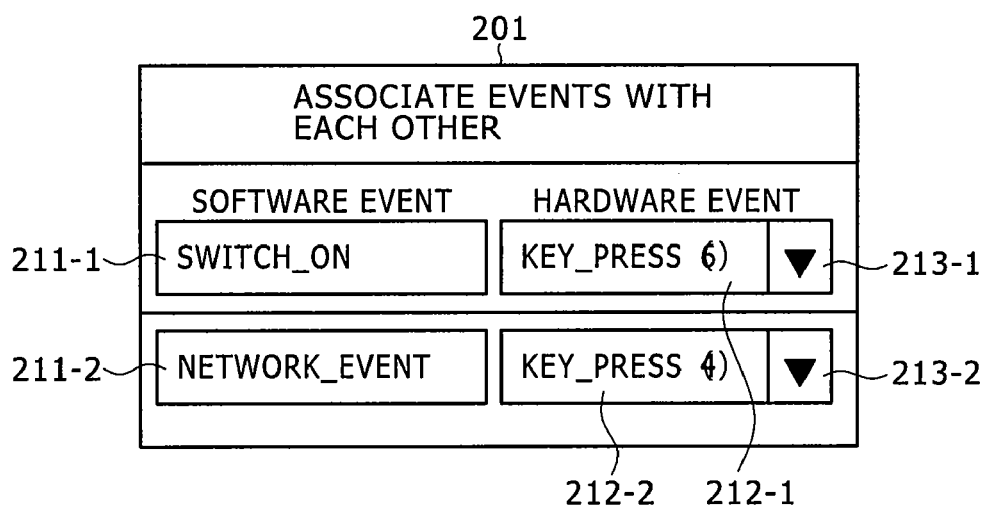
FIG.17
```
1 <events>
2  <mapping>
3   <software event>SWITCH_ON</software>
4   <hardware event>KEY_PRESS 6)</hardware>
5  </mapping>
6 </events>
```

INFORMATION PROCESSING METHOD, INFORMATION-PROCESSING APPARATUS, RECORDING MEDIUM, AND PROGRAM

CROSS REFERENCES TO RELATED APPLICATIONS

The present application claims priority to Japanese Patent Application JP 2005-267168 filed in the Japanese Patent Office on Sep. 14, 2005, the entire contents of which being incorporated herein by reference.

BACKGROUND

The present disclosure relates to an information processing method, an information-processing apparatus, a recording medium, and a program. More particularly, the present disclosure relates to an information processing method, an information-processing apparatus, a recording medium, and a program for recording the program capable of allowing a software event difficult to assign to a hardware event to be used in the same sense as a hardware event.

In general, a development tool for supporting development of an application program has been becoming popular. For example, there is a software development tool for supporting development of an object-oriented program. For more information on this software development tool, the reader is suggested to refer to Japanese Patent Laid-open No. Hei 6-110767.

In addition, there has also been proposed a software development tool for developing the UI (User Interface) of an application program using a state-transition diagram represented by a UML (Unified Modeling Language).

A state-transition diagram is a diagram showing a logical description of an operation to be carried out in every state and the direction of a transition caused by a predetermined event occurring in each specific state as a transition from the specific state to another. The aforementioned development tool for developing the UI (User Interface) of an application software program is a tool for editing the application program by showing the program as a state-transition diagram and reflecting the substance of an operation carried out on the state-transition diagram when the operation is carried out on the state-transition diagram.

An event occurring in each state mentioned above can be an event occurring due to a cause originated in hardware. Such an event is referred to as a hardware event. An example of the hardware event is an operation to press the 'A' character key of a keyboard. However, an event can also be an event other than a hardware event such as an operation to enter an input via a key of the keyboard described above. Examples of such an event are an operation to turn on the power supply and the arrival of a mail. Since these other events are not directly related to hardware, the same states as these other events are each generated by software in a pseudo manner, causing a transition to take place as if one of these other events had occurred. Since these other events are not directly related to hardware, they are each referred to as a software event.

In the apparatus in related art, software events each difficult to assign to a hardware event are collectively displayed on a separate window and manipulated separately from hardware events. By handling software events in this way, however, every time the user carries out an operation on a software event, the user needs change its line of sight to the separate window. Thus, the ease of operation deteriorates.

SUMMARY

In order to solve this problem, the present disclosure relates to an information processing method for handling software events each particularly difficult to assign to a hardware event in the same sense as hardware events.

According to an embodiment, an information-processing method adopted by an information-processing apparatus for editing state-transition information usable to construct a state-transition diagram includes information on the operation in each of states, information on events each possibly occurring in each specific one of the states to result in a transition, and information on transition directions each indicating the direction of a transition caused by each of the events possibly occurring in the states. The information-processing method includes:

searching for a hardware event not assigned yet as any one of the events;

assigning a hardware event found in a process carried out at the searching step as a shortcut event if the events include the software event;

generating the state-transition diagram on the basis of the state-transition information; and displaying the state-transition diagram.

If the events include a software event, a process is carried out at the assignment step to assign a hardware event found in the searching step as a shortcut event on the basis of a table showing a combination of the hardware event and the software event in advance by letting the combination shown in the table take precedence of other assignments.

If the events include a software event, a process is carried out at the assignment step to assign a keyboard-key operation selected among hardware events found in a process carried out at the searching step as a shortcut event by letting the keyboard-key operation take precedence of the other hardware events.

If the events include a software event, a process is carried out at the assignment step to assign a specific-keyboard-key, which is close to a keyboard key assigned to a hardware event found in a process carried out at the searching step, as a shortcut event by taking precedence of the other keyboard-key.

If the events include a software event, a process is carried out at the assignment step to assign a specific-keyboard-key, which is separated away from a keyboard key assigned to the hardware event assigned to a hardware event found in the searching step, as a shortcut event by taking precedence of the other keyboard-key.

Among the transition, a transition being assigned a shortcut event by the assignment step is displayed as a shortcut event by adoption of a display method different from display methods of other events.

According to an embodiment, an information-processing apparatus edits state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. The information-processing apparatus includes:

searching means configured to search for a hardware event not assigned yet as any one of the events;

assignment means configured to assign a hardware event found in a process carried out by the searching means as a shortcut event if the events include the software event;

generation means configured to generate the state-transition diagram on the basis of the state-transition information; and display means configured to display the state-transition diagram.

According to an embodiment, a program of a recording medium records a program, which can be read out by a computer for controlling an information-processing apparatus for editing state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. The program includes:

searching for a hardware event not assigned yet as any one of the events;

assigning a hardware event found in a process carried out at the searching step as a shortcut event if the events include the software event;

generating the state-transition diagram on the basis of the state-transition information; and displaying the state-transition diagram.

According to an embodiment, a program is executed by a computer for controlling an information-processing apparatus for editing state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. The program includes:

searching for a hardware event not assigned yet as any one of the events;

assigning a hardware event found in a process carried out at the searching step as a shortcut event if the events include the software event;

generating the state-transition diagram on the basis of the state-transition information; and displaying the state-transition diagram.

As described above, the information-processing method, apparatus, and a method according to an embodiment is an information-processing method adopted by an information-processing apparatus for editing state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. A search process is carried out to search for a hardware event not assigned yet as any one of the events is searched, a hardware event found in the search process is assigned as a shortcut event if the events include the software event, the state-transition diagram is generated on the basis of the state-transition information, and the state-transition diagram is displayed.

The information-processing apparatus can be an independent apparatus or a block for carrying out information processing of an information-processing apparatus.

As described above, according to an embodiment, a software event difficult to assign to a hardware event can be used in the same sense as a hardware event.

Additional features and advantages are described herein, and will be apparent from, the following Detailed Description and the figures.

BRIEF DESCRIPTION OF THE FIGURES

FIG. 15 is an explanatory diagram showing a selection screen for assigning a uniform shortcut event carried out by the state-transition program editing apparatus shown in FIG. 1;

FIG. 16 is an explanatory diagram showing a selection screen for assigning a uniform shortcut event carried out by the state-transition program editing apparatus shown in FIG. 1;

FIG. 17 is a diagram showing a description referred to in describing the processing carried out by the state-transition program editing apparatus shown in FIG. 1 to assign a uniform shortcut event;

DETAILED DESCRIPTION

An information processing method and program of an embodiment is an information-processing method adopted by an information-processing apparatus for editing state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. The information-processing method and the program each includes a searching step (such as a step S69 of a flowchart shown in FIG. 8), an assignment step (such as a step S70 of the flowchart shown in FIG. 8), a generation step (such as a step S126 of a flowchart shown in FIG. 12), and a display step (such as a step S141 of a flowchart shown in FIG. 13). The searching step searches for a hardware event not assigned yet as any one of the events. The assignment step designates a hardware event found in a process carried out at the searching step as a shortcut event if the events include the software event. The generation step generates the state-transition diagram on the basis of the state-transition information. The display step displays the state-transition diagram.

Figure 8:
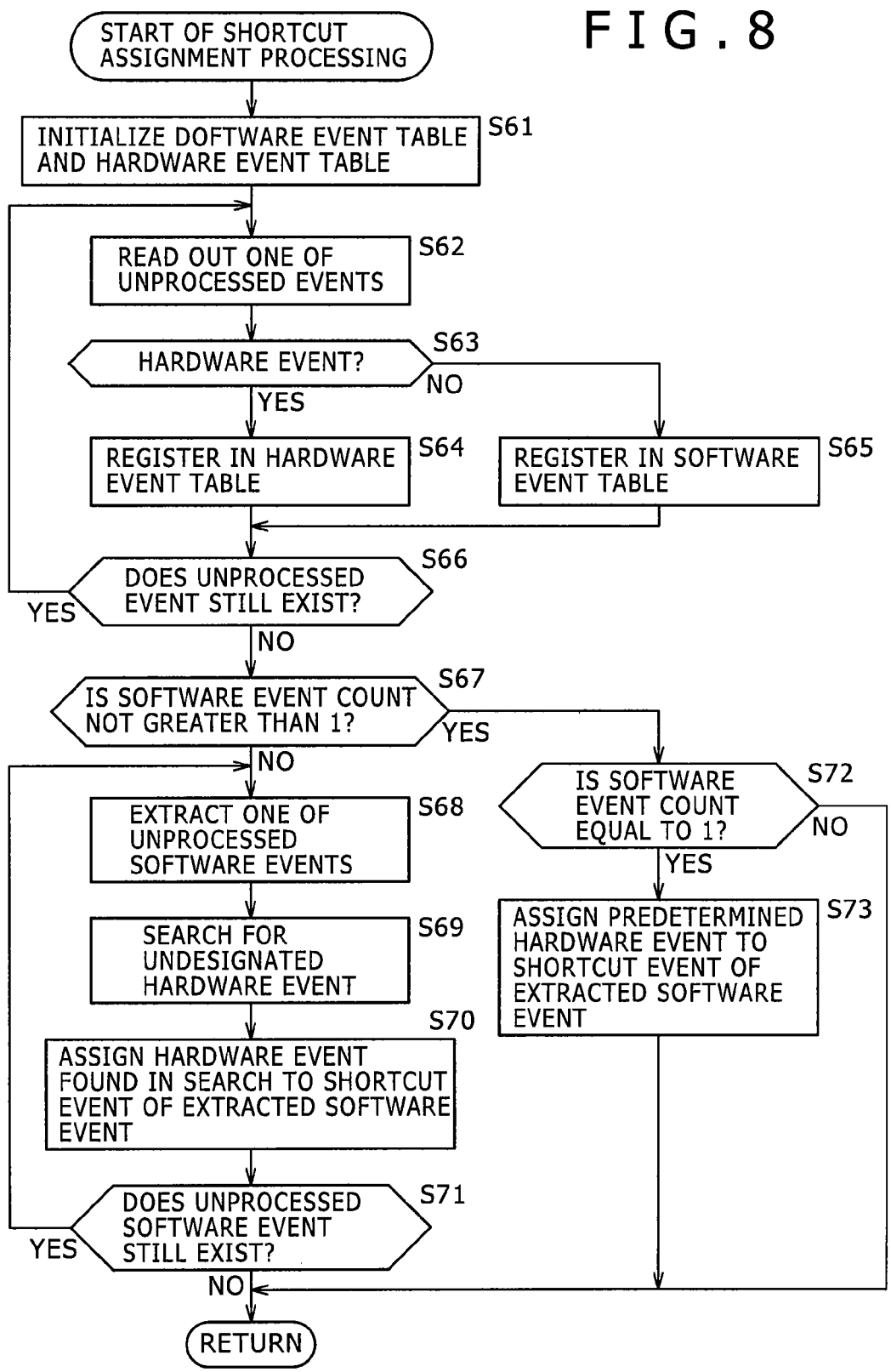
FIG. 8 shows a flowchart referred to in explanation of processing carried out by the state-transition program editing apparatus shown in FIG. 1 to assign a shortcut event.

If the events include a software event, a process is carried out at the assignment step (such as a process carried out at the step S70 of the flowchart shown in FIG. 8) to assign a hardware event found in the searching step as a shortcut event on the basis of a table showing a combination of the hardware event and the software event in advance by letting the combination shown in the table take precedence of other assignments.

If the events include a software event, a process is carried out at the assignment step (such as the process carried out at the step S70 of the flowchart shown in FIG. 8) to assign a keyboard-key operation selected among hardware events found in the process carried out at the searching step as a shortcut event by letting the keyboard-key operation take precedence of the other hardware events.

If the events include a software event, a process is carried out at the assignment step (such as the process carried out at the step S70 of the flowchart shown in FIG. 8) to assign a specific-keyboard-key, which is close to a keyboard key assigned to a hardware event found in a process carried out at the searching step, as a shortcut event by taking precedence of the other keyboard-key.

If the events include a software event, a process is carried out at the assignment step (such as the process carried out at the step S70 of the flowchart shown in FIG. 8) to assign a specific-keyboard-key, which is separated away from a keyboard key assigned to a hardware event found in the searching step, as a shortcut event by taking precedence of the other keyboard-key.

Figure 13:
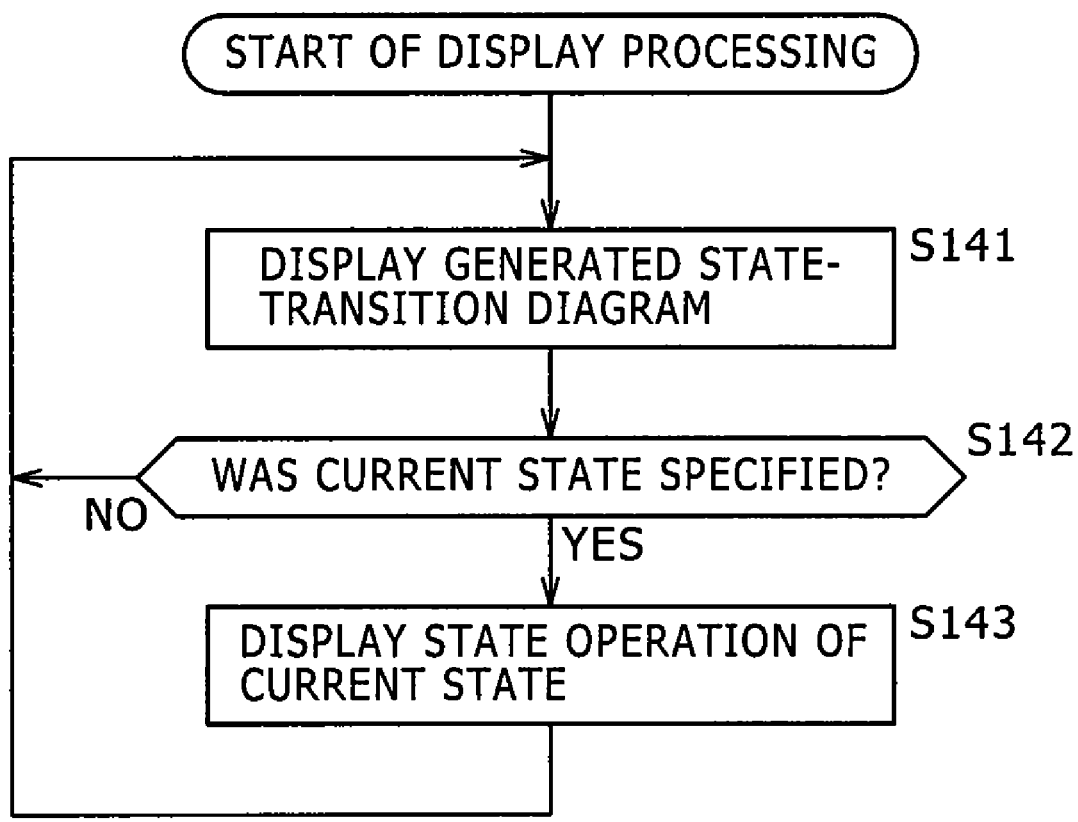
FIG. 13 shows a flowchart referred to in explanation of processing carried out by the state-transition program editing apparatus shown in FIG. 1 to display a screen.

Among the transition, a transition being assigned a shortcut event by the assignment step (such as a process carried out at the step S141 of the flowchart shown in FIG. 13) is displayed as a shortcut event by adoption of a display method different from display methods of other events.

According to an embodiment, an information-processing apparatus edits state-transition information usable to construct a state-transition diagram. The apparatus includes information on the operation in each of states, information on events each possibly occurring in each specific one of the states to result in a transition, and information on transition directions each indicating the direction of a transition caused by each of the events possibly occurring in the states. The information-processing apparatus includes searching means (such as an unassigned hardware event search section 45 shown in FIG. 1), assignment means (such as a shortcut event assignment section 44 shown in FIG. 1), generation means (such as a state-transition diagram generation section 15 shown in FIG. 1), and display means (such as a display control section 17 shown in FIG. 1).

The searching means is configured to search for a hardware event not assigned yet as any one of the events. The assignment means is configured to assign a hardware event found in a process carried out by the searching means as a shortcut event if the events include the software event. The generation means is configured to generate the state-transition diagram on the basis of the state-transition information. The display means is configured to display the state-transition diagram.

As described above, a hardware event not assigned yet as an other event is designated as a software event. Thus, the software event can be used in the same sense as the hardware event.

Figure 1:
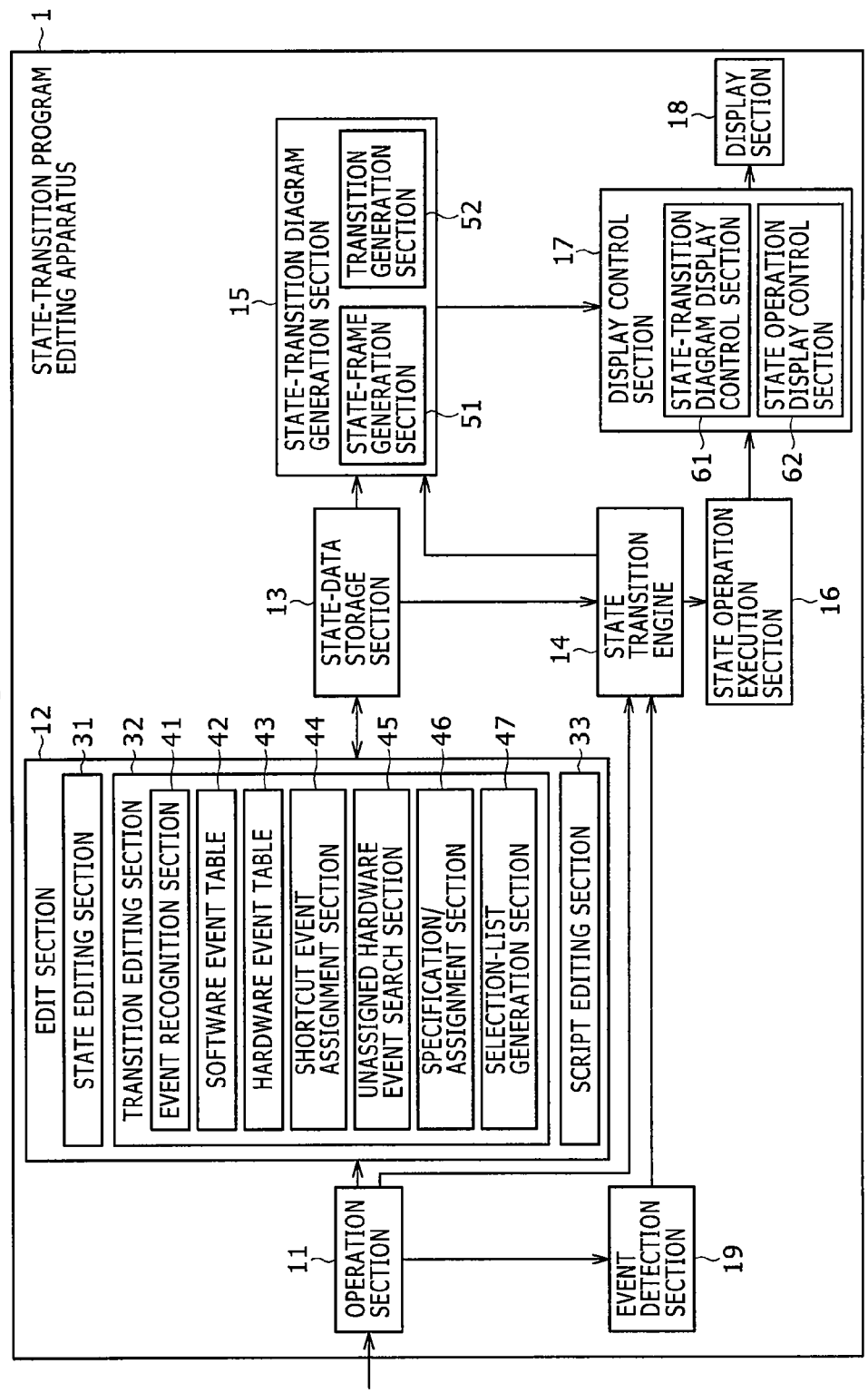
FIG. 1 is a block diagram showing an embodiment implementing a state-transition program editing apparatus according to an embodiment.

FIG. 1 is a diagram showing the configuration of an embodiment implementing a state-transition program editing apparatus 1 applying the embodiment.

The state-transition program editing apparatus 1 is an editing apparatus intended as an apparatus for developing a program of an UI in an application software program. The state-transition program editing apparatus 1 generates a state-transition diagram on the basis of state-transition information (or state data) including an operation in each state, an event causing a transition from each state to an other state, and transition-direction information indicating what other state serves as the destination of a transition for each state. The state-transition program editing apparatus 1 then displays the generated state-transition diagram. In addition, when an operation is carried out on the displayed state-transition diagram in order to update the diagram, the state-transition program editing apparatus 1 updates the information on state transitions for the updated state-transition diagram.

An operation section 11 has a configuration including a mouse and a keyboard. The operation section 11 is a unit for generating a signal representing an operation carried out by the user operating the state-transition program editing apparatus 1 and supplying the signal to an edit section 12.

The edit section 12 has a configuration including a state editing section 31, a transition editing section 32, and a script editing section 33. The edit section 12 is a unit for editing the state-transition information (or the state data) on the basis of a signal received from the operation section 11. The state data includes script information and transition information. The script information is information indicating an operation for each state. On the other hand, the transition information is information on a transition destination of each transition occurring in accordance with an event.

The state editing section 31 is a unit for generating a new state, editing information on the display position and display size and storing the result of the state editing process in a state-data storage section 13. The transition editing section 32 is a unit for editing information on a state serving as the destination of a transition occurring in accordance with an event happening in the course of an operation carried out in every state. The transition editing section 32 stores the result of the transition editing process in the state-data storage section 13.

The transition editing section 32 includes an event recognition section 41, a software event table 42, a hardware event table 43, a shortcut event assignment section 44, an unassigned hardware event search section 45, a specification/assignment section 46, and a selection-list generation section 47.

The event recognition section 41 is a unit for producing a result of determination as to whether a set event is a hardware event or a software event and storing the event in the software event table 42 or the hardware event table 43 in accordance with the result of the determination.

The shortcut event assignment section 44 is a unit for assigning a shortcut event of a software event to a hardware event found by the unassigned hardware event search section 45 as a hardware event unassigned yet as an event.

The specification/assignment section 46 is a unit for designating the same hardware event specified a plurality of shortcut events for a case in which a plurality of different hardware events may each be designated as a shortcut event to the same software event.

The selection-list generation section 47 is a unit controlled by the specification/assignment section 46 to generate a drop-down list used for designating a unified shortcut event to a plurality of shortcut events.

The script editing section 33 is a unit for editing the substance of an operation for each state and storing the result of the editing process in the state-data storage section 13.

The state-data storage section 13 is a unit used for storing state data including transition information and script information, which have been edited by the edit section 12, and supplying the state data to a state transition engine 14 or the state-transition diagram generation section 15 as necessary.

The state transition engine 14 is a unit for reading out state data from the state-data storage section 13 and searching the state for a current state on the basis of event information received from an event detection section 19. The state transition engine 14 supplies the result of the search process to the state-transition diagram generation section 15 and a state operation execution section 16.

The state-transition diagram generation section 15 has a configuration including a state-frame generation section 51 and a transition generation section 52. The state-transition diagram generation section 15 is a unit for reading out state data from the state-data storage section 13 to be used in a process to generate a state-transition diagram. The state-frame generation section 51 is a unit for generating a rectangular frame (a state frame) for each state and displaying the frame of the current state indicated by current-state information received from the state transition engine 14 by changing the color of the inside of the frame. The transition generation section 52 is a unit for generating an arrow pointing to a transition destination for each event occurring in an operation carried out in each state.

The state operation execution section 16 is a unit for executing an operation of the current state on the basis of state data received from the state transition engine 14 as the state data of the current state and supplying a result of the execution of the operation to the display control section 17.

The display control section 17 has a configuration including a state-transition diagram display control section 61 and a state operation display control section 62. The display control section 17 is a unit for generating a display screen and displaying the screen on a display section 18.

Figure 2:
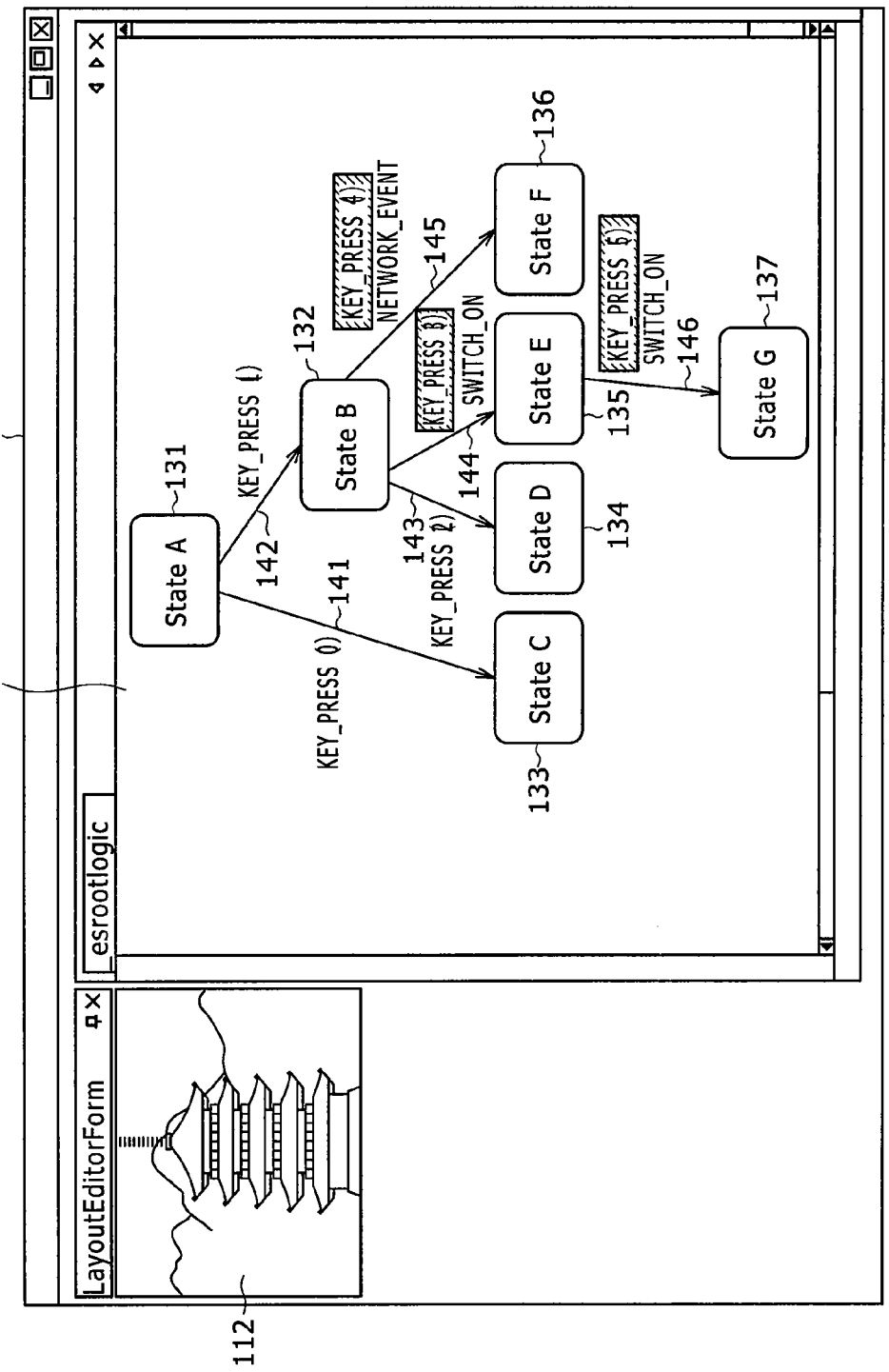
FIG. 2 is a diagram showing a typical configuration of a display screen.

The state-transition diagram display control section 61 is a unit for generating a state-transition diagram display screen 111 like one shown in FIG. 2 on the basis of information received from the state-transition diagram generation section 15 and display the generated state-transition diagram display screen 111. The state-transition diagram display screen 111 shown in FIG. 2 includes a state frame 131 of state A, a state frame 132 of state B, a state frame 133 of state C, a state frame 134 of state D, a state frame 135 of state E, a state frame 136 of state F, and a state frame 137 of state G. The state frame 131 to the state frame 137 are connected by transitions 141 to 146 each triggered by an event as a transition in a direction from one state to another.

To put it in detail, the transition 141 is expressed as an arrow representing a transition named KEY_PRESS (0) as a transition from state A to state C. To be more specific, in the case of an event representing an operation carried out on the '0' numerical key of the operation section 11 while the operation of state A is being executed, a transition occurs as a transition from state A to state C.

By the same token, the transition 142 is expressed as an arrow representing a transition named KEY_PRESS (1) as a transition from state A to state B. To be more specific, in the case of an event representing an operation carried out on the '1' numerical key of the operation section 11 while the operation of state A is being executed, a transition occurs as a transition from state A to state B.

In the same way, the transition 143 is expressed as an arrow representing a transition named KEY_PRESS (2) as a transition from state B to state D. To be more specific, in the case of an event representing an operation carried out on the '2' numerical key of the operation section 11 while the operation of state B is being executed, a transition occurs as a transition from state B to state D.

Likewise, the transition 144 is expressed as an arrow representing a transition named KEY_PRESS (3) SWITCH_ON as a transition from state B to state E. To be more specific, in the case of a SWITCH_ON software event representing an operation to turn on a switch while the operation of state B is being executed, a transition occurs as a transition from state B to state E. In addition, KEY_PRESS (3) is displayed in a color to indicate that an operation carried out by operating the '3' numerical key of the operation section 11 has been designated as a shortcut event assigned to the SWITCH_ON software event and will result in a transition from state B to state E.

Similarly, the transition 145 is expressed as an arrow representing a transition named KEY_PRESS (4) NETWORK_EVENT as a transition from state B to state F. To be more specific, in the case of the occurrence of a NETWORK_EVENT software event such as the event of an arriving mail in the course of the execution of the operation of state B, a transition occurs as a transition from state B to state F. In addition, KEY_PRESS (4) is displayed in a color to indicate that an operation carried out by operating the '4' numerical key of the operation section 11 has been designated as a shortcut event assigned to the NETWORK_EVENT software event and will result in a transition from state B to state F.

By the same token, the transition 146 is expressed as an arrow representing a transition named KEY_PRESS (5) SWITCH_ON as a transition from state E to state G. To be more specific, in the case of a SWITCH_ON software event representing an operation to turn on a switch while the operation of state E is being executed, a transition occurs as a transition from state E to state G. In addition, KEY_PRESS (5) is displayed in a color to indicate that an operation carried out by operating the '5' numerical key of the operation section 11 has been designated as a shortcut event assigned to the SWITCH_ON software event and will result in a transition from state E to state G.

Let us refer back to FIG. 1 in order to continue the explanation of the state-transition program editing apparatus 1.

The state operation display control section 62 is a unit for generating a state-operation display screen 112 like one shown in FIG. 2 on the basis of data received from the state operation execution section 16 as a result of execution of a state operation and controlling a process to display the generated state-operation display screen 112.

The display section 18 has a configuration including a CRT (Cathode Ray Tube) display unit or an LCD (Liquid Crystal Display) unit. The display section 18 is a unit for displaying screens generated by the display control section 17.

Figure 3:
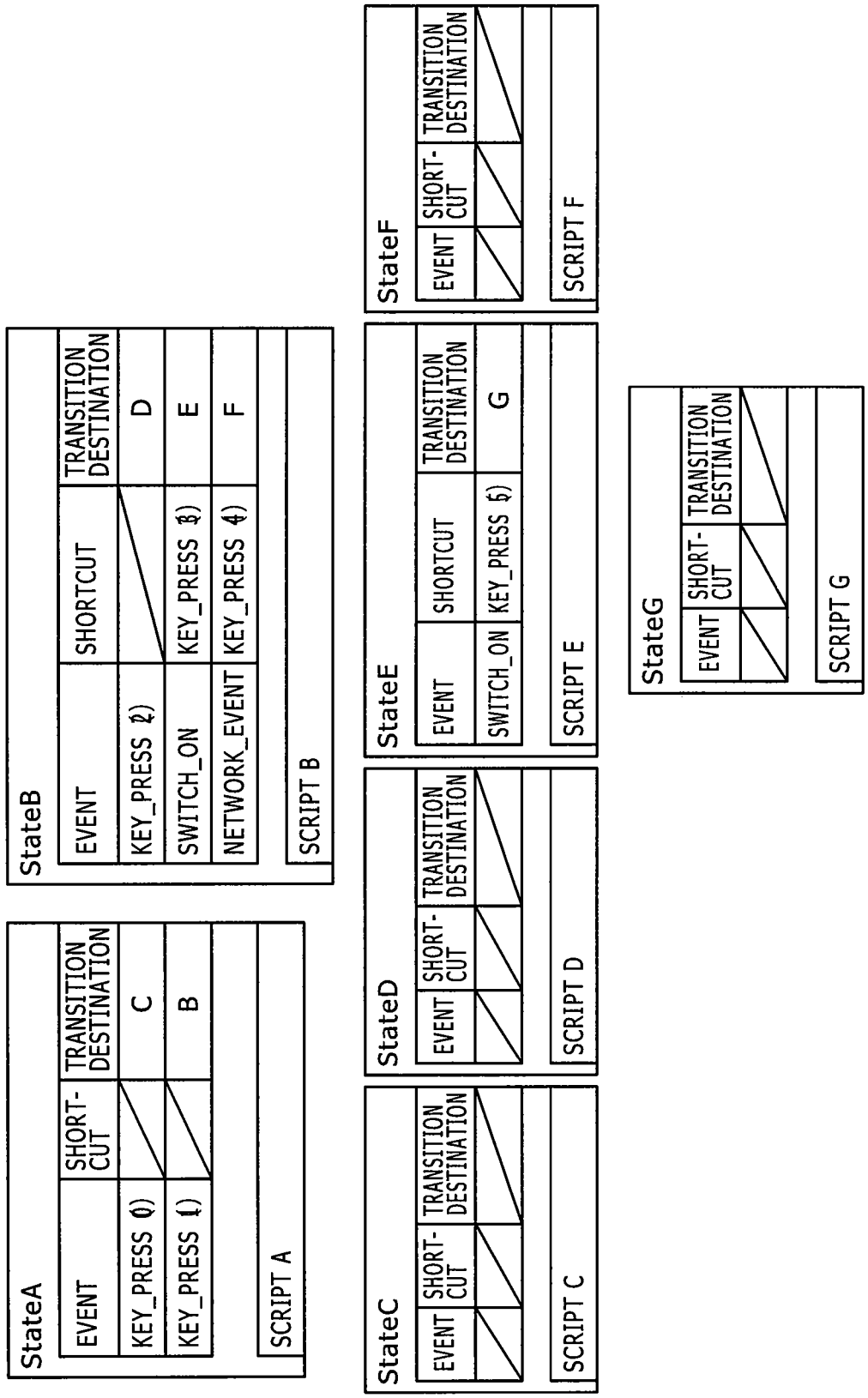
FIG. 3 is a diagram showing the structure of state information stored in a state-data storage section.

Next, state information stored in the state-data storage section 13 is explained by referring to FIG. 3.

In the case of the typical state-transition diagram having a configuration like the one appearing on the state-transition diagram display screen 111 shown in FIG. 2, for example, the state information is stored in the state-data storage section 13 for states A to G in a structure like one shown in FIG. 3. As shown in FIG. 3, the state data is stored as pieces of transition information for states A to G in a data structure of the states arranged sequentially in an order starting with state A at the upper left corner of the figure.

To each of the states, an area is allocated for recording information on the state as transition information, which includes hardware and software events, shortcut events each provided for an event occurring as a software event, and transition destinations. In addition, another area is allocated to each of the states for recording a script for the state.

To be more specific, the transition information provided for state A as shown in FIG. 3 includes an event column used for recording hardware events of KEY_PRESS (0) and KEY_PRESS (1). The information on transitions also includes a transition-destination column used for recording states C and B as transition destinations for KEY_PRESS (0) and KEY_PRESS (1) respectively. That is to say, the information on transitions includes pieces of information corresponding to the transitions 141 and 142 shown in FIG. 2. In accordance with the information on transitions, in the case of an event representing an operation carried out on the '0' numerical key, a transition occurs as a transition from state A to state C. By the same token, in the case of an event representing an operation carried out on the '1' numerical key, a transition occurs as a transition from state A to state B. In the case of state A, in an area below the information on transitions, script A is described as script information, which describes an operation carried out in state A. It is to be noted that, since all the events of state A are hardware events, shortcut events are not necessary. In this case, slanting lines are shown to indicate that there is no information.

The information on transitions for state B includes an event column used for recording a KEY_PRESS (2) hardware event as well as SWITCH_ON and NETWORK_EVENT software events. The information on transitions also includes a transition-destination column used for recording states D, E, and F as transition destinations for the events of KEY_PRESS (2), SWITCH_ON and NETWORK_EVENT respectively. That is to say, the information on transitions includes pieces of information corresponding to the transitions 143 to 145 shown in FIG. 2. However, the SWITCH_ON and NETWORK_EVENT events are each a software event that is difficult to be generated by hardware directly. In this case, KEY_PRESS (3) and KEY_PRESS (4) hardware events are set on a shortcut-event column for the SWITCH_ON and NETWORK_EVENT software events respectively. That is to say, in accordance with this information on transitions, a shortcut-key operation carried out by operating the '3' numerical key will result in the SWITCH_ON software event and cause a transition from state B to state E. On the other hand, a shortcut-key operation carried out by operating the '4' numerical key will result in a NETWORK_EVENT software event causing a transition from state B to state F. In the case of state B, in an area below the information on transitions, script B is described as script information.

In the case of state C, there is no information on transitions. No information on transitions means that there is no transition from this state. In addition, in the case of state C, in an area below the information on transitions, script C is described as script information.

In the case of state D, there is no information on transitions. No information on transitions means that there is no transition from this state. In addition, in the case of state D, in an area below the information on transitions, script D is described as script information.

The information on transitions for state E includes an event column used for recording a SWITCH_ON software event. The information on transitions also includes a transition-destination column used for recording state G as a transition destination for the event of SWITCH_ON. That is to say, the information on transitions includes information corresponding to the transition 146 shown in FIG. 2. The SWITCH_ON event is a software event that is difficult to be generated by hardware directly. In this case, a KEY_PRESS (5) hardware event designated as a shortcut event is set on a shortcut-event column. That is to say, in accordance with this information on transitions, a shortcut-key operation carried out by operating the '5' numerical key will result in the SWITCH_ON software event and cause a transition from state E to state G. In the case of state E, in an area below the information on transitions, script E is described as script information.

In the case of state F, there is no information on transitions. No information on transitions means that there is no transition from this state. In addition, in the case of state F, in an area below the information on transitions, script F is described as script information.

In the case of state G, there is no information on transitions. No information on transitions means that there is no transition from this state. In addition, in the case of state G, in an area below the information on transitions, script G is described as script information.

Figure 4:
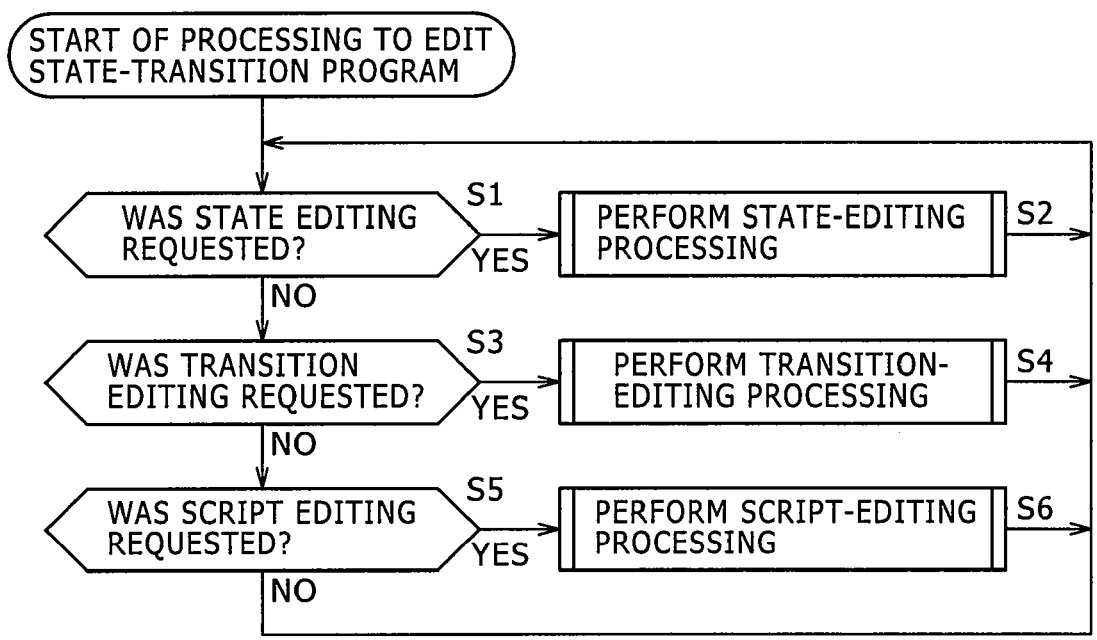
FIG. 4 shows a flowchart referred to in explanation of processing carried out by the state-transition program editing apparatus shown in FIG. 1 to edit a state-transition program.

Next, processing carried out by the edit section 12 to edit a state-transition program is explained by referring to a flowchart shown in FIG. 4.

As shown in the figure, the flowchart begins with a step S1 at which, on the basis of a signal received from the operation section 11, the state editing section 31 produces a result of determination as to whether or not state-editing processing has been requested. If the determination result produced in the process carried out at the step S1 indicates that state-editing processing has been requested, the flow of the processing goes on to a step S2 at which the state editing section 31 carries out the state-editing processing. After the execution of the state-editing processing, the flow of the processing goes back to the step S1. It is to be noted that the state-editing processing will be described later by referring to a flowchart shown in FIG. 5.

If the determination result produced in the process carried out at the step S1 indicates that state-editing processing has not been requested, on the other hand, the flow of the processing goes on to a step S3 at which, on the basis of a signal received from the operation section 11, the transition editing section 32 produces a result of determination as to whether or not transition-editing processing has been requested. If the determination result produced in the process carried out at the step S3 indicates that transition-editing processing has been requested, the flow of the processing goes on to a step S4 at which the transition editing section 32 carries out the transition-editing processing. After the execution of the transition-editing processing, the flow of the processing goes back to the step S1. It is to be noted that the transition-editing processing will be described later by referring to a flowchart shown in FIG. 6.

If the determination result produced in the process carried out at the step S3 indicates that transition-editing processing has not been requested, on the other hand, the flow of the processing goes on to a step S5 at which, on the basis of a signal received from the operation section 11, the script editing section 33 produces a result of determination as to whether or not script-editing processing has been requested. If the determination result produced in the process carried out at the step S5 indicates that script-editing processing has been requested, the flow of the processing goes on to a step S6 at which the script editing section 33 carries out the script-editing processing. After the execution of the script-editing processing, the flow of the processing goes back to the step S1. It is to be noted that the script-editing processing will be described later by referring to a flowchart shown in FIG. 7.

Since state data is updated in the processing described above, a corresponding state-transition program is also updated.

Next, the state-editing processing will be described later by referring to the flowchart shown in FIG. 5.

As shown in the figure, the flowchart begins with a step S21 at which, on the basis of a signal received from the operation section 11, the state editing section 31 produces a result of determination as to whether or not the processing is processing to generate a new state. The processing to generate a new state can be requested by typically operating a button not shown in the display screen 101 of FIG. 2. If the result of the determination indicates that the processing to generate a new state has been requested, the flow of the processing goes on to a step S22 at which the state editing section 31 generates the new state. That is to say, the state editing section 31 records state information for the new state in the state-data storage section 13.

Then, at the next step S23, the state editing section 31 sets the newly generated state as a state to be edited.

Subsequently, at the next step S24, the state editing section 31 produces a result of determination as to whether or not the state information of the state to be edited needs to be updated. Pieces of state information examined to produce such a result of determination include the name of the state and the display location of the state frame. That is to say, the pieces of state information edited by the state editing section 31 include the name of the state and the display location of the state frame.

If the determination result produced in the process carried out at the step S24 indicates that the state information such as the name of the state and the display location of the state frame needs to be updated, the flow of the processing goes on to a step S25 at which the state editing section 31 updates the state information of the edited state to reflect the updated name of the state and the updated display location of the state frame in the state information.

If the determination result produced in the process carried out at the step S24 indicates that no state information needs to be updated, on the other hand, the flow of the processing goes on to a step S26, skipping the process of the step S25.

At the step S26, the state editing section 31 produces a result of determination as to whether or not termination of the processing to edit a state has been requested. If the result of the determination indicates that the termination of the processing to edit a state has not been requested, the flow of the processing goes back to the step S24. If the result of the determination indicates that the termination of the processing to edit a state has been requested, on the other hand, the execution of the processing to edit a state is ended.

If the determination result produced in the process carried out at the step S21 indicates that the processing is not processing to generate a new state, on the other hand, the flow of the processing goes on to a step S27 at which the state editing section 31 produces a result of determination as to whether or not an existing state has been selected. To put it concretely, for example, the state editing section 31 produces a result of determination as to whether or not any one of the state frames 131 to 137 appearing on the state-transition diagram display screen 111 shown in FIG. 2 has been selected by being pointed to by a pointer shown in none of the figures as a result of an operation carried out on the operation section 11. The state frames 131 to 137 are displayed on the state-transition diagram display screen 111 as a result of display processing to be described later by referring to a flowchart shown in FIG. 13. By selecting one of the state frames 131 to 137, one of pieces of information stored in the state-data storage section 13 as pieces of state information of states A to G is selected. If the result of the determination indicates that an existing state has been selected, the flow of the processing goes on to a step S28 at which the state editing section 31 sets the selected state as a state to be edited. Then, the flow of the processing goes on to the step S24.

If the determination result produced in the process carried out at the step S27 does not indicate that an existing state has been selected, on the other hand, the flow of the processing goes back to the step S21 to repeat the processing described so far.

Thus, by carrying out the processing described above, the state information of a new state or one of existing states is newly set or updated. As described earlier, the state information of a state includes the name of the state and the display position of the state frame.

Next, processing to edit a transition is explained with reference to the flowchart shown in FIG. 6.

As shown in the figure, the flowchart begins with a step S41 at which the transition editing section 32 produces a result of determination as to whether or not an existing state has been selected. If the result of the determination indicates that an existing state has not been selected, the flow of the processing goes back to the step S41 to repeat the determination process of this step. The determination process of the step S41 is carried out repeatedly till the result of the determination indicates that an existing state has been selected. For example, the transition editing section 32 produces a result of determination as to whether or not any one of the state frames 131 to 137 appearing on the state-transition diagram display screen 111 shown in FIG. 2 has been selected by being pointed to by a pointer shown in none of the figures as a result of an operation carried out on the operation section 11. The state frames 131 to 137 are displayed on the state-transition diagram display screen 111 as a result of the display processing to be described later to the flowchart shown in FIG. 13. By selecting one of the state frames 131 to 137, one of pieces of information stored in the state-data storage section 13 as pieces of state information of states A to G is selected. As the determination result produced in the process carried out at the step S41 indicates that an existing state has been selected, the flow of the processing goes on to a step S42 at which the transition editing section 32 sets the selected state as a state to be edited. Then, the flow of the processing goes on to a step S43.

At the step S43, the transition editing section 32 produces a result of determination as to whether or not the state information of the edited state includes a specified transition destination. Assuming, for example, that state A is selected among states A to G shown respectively in the state frames 131 to 137 appearing on the state-transition diagram display screen 111 shown in FIG. 2. Also assuming, for example, that the user operates the operation section 11 to drag a pointer shown in none of the figures from the state frame 131 of state A to the state frame 133 of state C as shown by an arrow representing the transition 141 from the state frame 131 serving as the origin to the state frame 133 serving as the end point. In this case, the transition destination is set in state C.

Thus, at the step S43, the transition editing section 32 produces a result of determination as to whether or not a transition destination has been set by determining whether or not a transition arrow has been drawn from a state frame showing the edited state to a state frame showing the state of the transition destination as described above.

If the determination result produced in the process carried out at the step S43 indicates that a transition destination has been set, the flow of the processing goes on to a step S44 at which the transition editing section 32 makes a request to specify an event. To put it more concretely, let us assume that the transition 141 shown in FIG. 2 has been drawn by dragging a pointer shown in none of the figures. In this case, the transition editing section 32 shows an empty area shown in none of the figures besides the transition 141 as an area used for entering an event, and prompts the user to enter an event.

Then, at the next step S45, the transition editing section 32 produces a result of determination as to whether or not an event causing a transition has been specified. If the result of the determination indicates that an event causing a transition has not been specified, the flow of the processing goes back to the step S45 to repeat the determination process of this step. As a matter of fact, the determination process of the step S45 is carried out repeatedly till the result of the determination indicates that an event causing a transition has been specified. Therefore, the transition editing section 32 produces a result of determination as to whether or not an event causing a transition has been specified by determining whether or not information specifying an event has been entered to the empty area.

As the determination result produced in the process carried out at the step S45 indicates that an event causing a transition has been specified, the flow of the processing goes on to a step S46 at which the transition editing section 32 makes an access to the state-data storage section 13 to read out state information of the edited state from the state-data storage section 13. Then, the transition editing section 32 updates the state information to reflect the specified transition destination and the entered event in the state information. In the case of the transition 141 shown in FIG. 2, for example, state C is specified as the transition destination and KEY_PRESS (0) is entered as the event. Thus, the state information is updated by adding state C and KEY_PRESS (0) as the transition destination and the event respectively to the state information as shown in FIG. 3. Then, the flow of the processing goes on to the step S47.

If the determination result produced in the process carried out at the step S43 indicates that a transition destination has not been set, the flow of the processing goes on to the step S47, skipping the processes of the steps S44 to S46. At the step S47, the transition editing section 32 produces a result of determination as to whether or not termination of the processing to edit a transition has been requested. If the result of the determination indicates that the termination of the processing to edit a transition has not been requested, the flow of the processing goes back to the step S43. That is to say, the processes of the steps S43 to S47 are carried out repeatedly till the result of the determination indicates that the termination of the processing to edit a transition has been requested.

Figure 7:
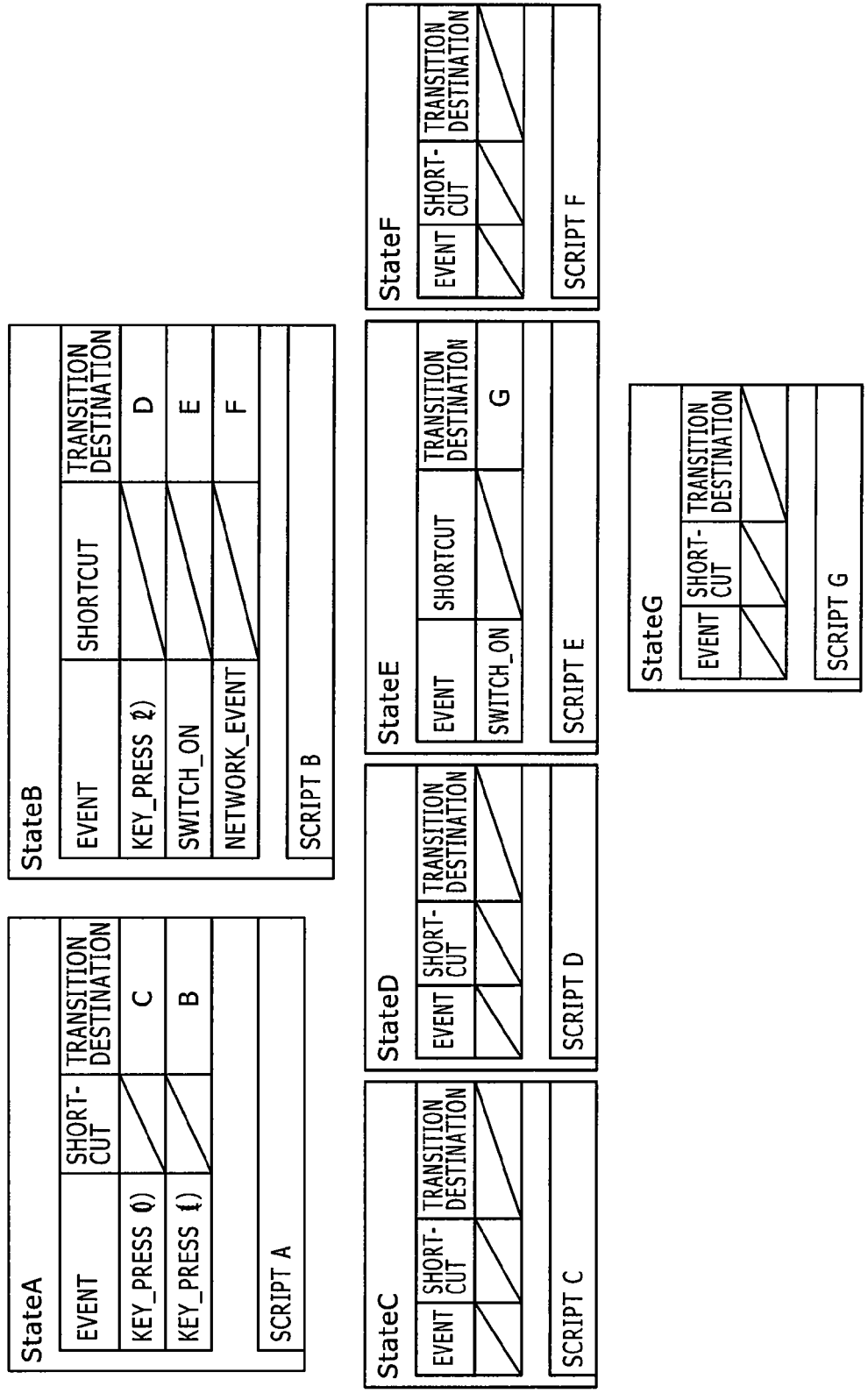
FIG. 7 shows a diagram referred to in explanation of processing carried out by the state-transition program editing apparatus shown in FIG. 1 to edit a transition.

By carrying out the processing described above, for the state-transition diagram appearing on the state-transition diagram display screen 111 shown in FIG. 2, a state may have information on the event column but no information on the shortcut column as shown in FIG. 7. Since events in every state are the same as those of the state-transition information shown in FIG. 3, explanation of the events is not repeated.

As the determination result produced in the process carried out at the step S47 indicates that the termination of the processing to edit a transition has been requested, the flow of the processing goes on to a step S48 at which processing to assign a shortcut event is carried out.

Next, processing to assign shortcut events is described with reference to a flowchart shown in FIG. 8 as follows.

As shown in the figure, the flowchart begins with a step S61 at which the transition editing section 32 initializes the software event table 42 and the hardware event table 43 by erasing data store in these tables.

Then, at the next step S62, the event recognition section 41 reads out one of unprocessed events from all pieces of transition information of state data stored in the state-data storage section 13. Assuming, for example, that state data like the one shown in FIG. 7 has been stored in the state-data storage section 13. In this case, for example, the event recognition section 41 reads out KEY_PRESS (0) as an unprocessed event from all the pieces of state data.

Subsequently, at the next step S63, the event recognition section 41 produces a result of determination as to whether or not the retrieved event is a hardware event. In this case, since KEY_PRESS (0) is read out as an event, the event recognition section 41 produces a determination result indicating that the retrieved event is a hardware event, causing the flow of the processing to go on to a step S64 at which he event recognition section 41 registers the event in the hardware event table 43. That is to say, since KEY_PRESS (0) read out as an event is a hardware event, the KEY_PRESS (0) event is registered in the hardware event table 43.

Subsequently, at the next step S66, the event recognition section 41 produces a result of determination as to whether or not an unprocessed event still exists. If the result of the determination indicates that an unprocessed event still exists, the flow of the processing goes back to the step S62. If SWITCH_ON is read out as an unprocessed event for example in the process carried out at the step S62, on the other hand, in the process carried out at the step S63, the event recognition section 41 produces a determination result indicating that the retrieved event is a software event, causing the flow of the processing to go on to a step S65 at which he event recognition section 41 registers the event in the software event table 42. That is to say, since SWITCH_ON read out as an event is a software event, the SWITCH_ON software event is registered in the software event table 42.

By carrying out the processes of the steps S62 to S66 repeatedly, all events stored in the state-data storage section 13 are registered in the software event table 42 and the hardware event table 43, depending on whether the event is a hardware or software event.

If the determination result produced in the process carried out at the step S66 indicates that an unprocessed event no longer exists, on the other hand, the flow of the processing goes on to a step S67 at which the shortcut event assignment section 44 makes an access to the software event table 42 in order to produce a result of determination as to whether or not the number of registered unprocessed software events is not greater than one. If the state data stored in the state-data storage section 13 is the state data shown in FIG. 7, the number of software events registered in the software event table 42 is three. The three software events are SWITCH_ON of state B, NETWORK_EVENT of state B, and SWITCH_ON of state E. Thus, in this case, the determination result produced in the process carried out at the step S67 indicates that the number of registered unprocessed software events is greater than one, causing the flow of the processing to go on to a step S68.

At the step S68, the shortcut event assignment section 44 makes an access to the software event table 42 in order to extract one unprocessed software event. For example, the shortcut event assignment section 44 extracts SWITCH_ON shown in FIG. 7 as a software event of state B.

Subsequently, at the next step S69, the shortcut event assignment section 44 controls the unassigned hardware event search section 45 to make an access to the hardware event table 43 in order to search the hardware event table 43 for an undesignated hardware event. In the case of the state data shown in FIG. 7, hardware events caused by operating the '0', '1', and '2' numerical keys of the keyboard have already been used as transition events of states A and B. Thus, since a hardware event caused by operating the '3' numerical key of the keyboard has not been assigned yet, the hardware event caused by operating the '3' numerical key is found in the search process.

Subsequently, at the next step S70, the shortcut event assignment section 44 designates the hardware event, which has been found in the search process carried out by the unassigned hardware event search section 45 as the hardware event caused by operating the '3' numerical key, as a shortcut event assigned to the SWITCH_ON software event of state B. Therefore, the shortcut event assignment section 44 generates a description like one shown in FIG. 9 in order to designate a shortcut event. To be more specific, the description shown in FIG. 9 as a description between <events> on line 1 and <events> on line 6 indicates that the description between lines 1 and 6 describes a shortcut event. Furthermore, an inner description between <mapping> on line 2 and <mapping> on line 5 indicates that the description between lines 2 and 5 describes a hardware event designated as the shortcut event assigned to a software event. In addition, <software event>SWITCH_ON</software> described on line 3 indicates that the software event assigned to the shortcut event is a SWITCH_ON software event, which is the event of turning on the switch of the power supply. On the other hand, <hardware event>KET_PRESS (3)</hardware> described on line 4 indicates that the hardware event designated as the shortcut event is a KEY_PRESS (3) hardware event representing an operation carried out on the '3' numerical key of the keyboard.

By carrying out the processes described above, the KEY_PRESS (3) hardware event is designated as a shortcut event assigned to the SWITCH_ON software event for state B as shown in FIG. 3.

Then, at the next step S71, the shortcut event assignment section 44 produces a result of determination as to whether or not a registered unprocessed software event still exists in the software event table 42. If the result of the determination indicates that a registered unprocessed software event still exists in the software event table 42, the flow of the processing goes back to the step S68. In this way, the processes of the steps S68 to S71 are carried out repeatedly till all the software events are each assigned to a shortcut event implemented by a hardware event. As the result of the determination indicates that a registered unprocessed software event no longer exists in the software event table 42, that is, as all the software events are each assigned to a shortcut event implemented by a hardware event, the execution of the processing to assigned shortcut events is ended.

If the determination result produced in the process carried out at the step S67 indicates that the number of registered unprocessed software events is not greater than one, on the other hand, the flow of the processing to go on to a step S72 at which the shortcut event assignment section 44 produces a result of determination as to whether or not the number of registered unprocessed software events is equal to one. If the result of the determination indicates that the number of registered unprocessed software events is equal to one, the flow of the processing goes on to a step S73 at which the shortcut event assignment section 44 extracts a predetermined hardware event and designates the extracted hardware event as a shortcut event assigned to the only registered unprocessed software event. That is to say, if there is only one registered unprocessed software event, a predetermined hardware event that can be used most easily is designated as a shortcut event assigned to the software event. An example of the hardware event that can be used most easily is an event representing an operation to press the space key of the keyboard. In this case, the only registered unprocessed software event is assigned to a shortcut event implemented by a hardware event representing an operation that can be carried out with ease.

If the determination result produced in the process carried out at the step S72 indicates that the number of registered unprocessed software events is not equal to one, on the other hand, the execution of the processing to assign shortcut events is ended.

By carrying out the processing described above, information on transitions can be edited by merely operating a button of the operation section 11 and drawing an arrow from the state frame of a state serving as an object of editing to the state frame of a transition destination. In addition, since a unique hardware event can be individually designated as a shortcut event assigned to each software event, a software event can also be processed in the same way as a hardware event.

It is to be noted that, in the process carried out at the step S70 to designate a hardware event, which has been found by the unassigned hardware event search section 45, a table assigning each software event to a hardware event in advance can also be used. In this case, each of the assignments shown in the table is given a high priority in the process to designate a hardware event as a shortcut event assigned to a software event. Let us assume for example that a hardware event representing an operation carried out on a specific key of the keyboard has been designated as a shortcut event assigned to a software event in a priority-based assignment process according to the embodiment. In this case, a hardware event representing an operation carried out on a key close to the specific key is designated as a shortcut event assigned to a software event being processed by letting the specific key take precedence of other keys. In this way, the user is capable of finding the nearby key quickly in an operation to press the key. Such a nearby key can be identified from the key layout of the keyboard on the basis of information associating keys of the keyboard with hardware events each already designated as a shortcut event assigned to a software event. Conversely speaking, in order to reduce the number of operations to press wrong keys, a hardware event representing an operation carried out on a key far away from the specific key is designated as a shortcut event assigned to a software event being processed by letting the far-away key take precedence of other keys. By the same token, such a far-away key can be identified from the key layout of the keyboard on the basis of information associating keys of the keyboard with hardware events each already designated as a shortcut event assigned to a software event.

Next, processing to edit a script is explained with reference to the flowchart shown in FIG. 10.

As shown in the figure, the flowchart begins with a step S91 at which the script editing section 33 produces a result of determination as to whether or not an existing state has been selected. If the result of the determination indicates that an existing state has not been selected, the flow of the processing goes back to the step S91 to repeat the determination process of this step. The determination process of the step S91 is carried out repeatedly till the result of the determination indicates that an existing state has been selected. For example, the script editing section 33 produces a result of determination as to whether or not any one of the state frames 131 to 137 appearing on the state-transition diagram display screen 111 shown in FIG. 2 has been selected by being pointed to by a pointer shown in none of the figures as a result of an operation carried out on the operation section 11. The state frames 131 to 137 are displayed on the state-transition diagram display screen 111 as a result of the display processing to be described later by referring to the flowchart shown in FIG. 13. By selecting one of the state frames 131 to 137, one of pieces of information stored in the state-data storage section 13 as pieces of state data of states A to G is selected. As the determination result produced in the process carried out at the step S91 indicates that an existing state has been selected, the flow of the processing goes on to a step S92 at which the script editing section 33 sets the selected state as a state to be edited. Then, the flow of the processing goes on to a step S93.

At the step S93, the script editing section 33 produces a result of determination as to whether or not the script of the selected state has been updated. The script of a state can be updated by moving a pointer shown in none of the figures to the script in the state frame of the state by operating the operation section 11 and then operating the keyboard employed in the operation section 11.

If the determination result produced in the process carried out at the step S93 indicates that the script information of the selected state has been updated, the flow of the processing goes on to a step S94 at which the script editing section 33 makes an access to the state-data storage section 13 in order to read out state data of the state serving as an object of editing. Then, the script editing section 33 changes the script information on the basis of the edited script in order to update the state information.

Then, at the next step S95, the script editing section 33 produces a result of determination as to whether or not termination of the processing to edit script information has been requested. If the result of the determination indicates that the termination has not been requested, the flow of the processing goes back to the step S91. If the result of the determination indicates that the termination has been requested, on the other hand, the execution of the processing to edit script information is ended.

By carrying out the processing described above, script information can be edited.

Next, the processing to execute a state-transition program is explained with reference to the flowchart shown in FIG. 11.

As shown in the figure, the flowchart begins with a step S101 at which, on the basis of an operation signal received from the operation section 11, the state transition engine 14 produces a result of determination as to whether or not one of existing states appearing on the state-transition diagram display screen 111 has been selected. On the basis of an operation signal received from the operation section 11, for example, the state transition engine 14 produces a result of determination as to whether or not any one of the state frames 131 to 137 appearing on the state-transition diagram display screen 111 shown in FIG. 2 has been selected by being pointed to by a pointer shown in none of the figures as a result of an operation carried out on the operation section 11. The determination process of the step S101 is carried out repeatedly till the result of the determination indicates that an existing state has been selected.

As the determination result produced in the process carried out at the step S101 indicates that an existing state has been selected, the flow of the processing goes on to a step S102 at which the state transition engine 14 sets the selected state as the current state. That is to say, as the current state, the state transition engine 14 sets a state corresponding to the state frame, which has been selected by being pointed to by a pointer shown in none of the figures among the state frames 131 to 137 appearing on the state-transition diagram display screen 111 shown in FIG. 2 as evidenced by an operation signal received from the operation section 11.

Then, at the next step S103, the state transition engine 14 makes an access to the state-data storage section 13 in order to read out state information of the current state and supplies the state information to the state operation execution section 16.

Subsequently, at the next step S104, the state operation execution section 16 interprets state information received from the state transition engine 14 as the state data of the current state. In particular, the state operation execution section 16 retrieves script information from the state information and recognizes the operation of the state on the basis of the script information.

Then, at the next step S105, the state operation execution section 16 carries out processing described in the script information.

Subsequently, at the next step S106, the state operation execution section 16 produces a result of determination as to whether or not termination of state-transition processing has been requested. If the result of the determination indicates that the termination has not been requested, the flow of the processing goes on to step S107.

At the step S107, the state transition engine 14 produces a result of determination as to whether or not an event has occurred. That is to say, the state transition engine 14 produces a result of determination as to whether or not information on an event has been received from the event detection section 19. If the result of the determination indicates that no event has occurred, the flow of the processing goes back to the step S105 to repeat the processes of the steps S105 to S107 described above. These processes are carried out repeatedly until the event is detected. As the determination result produced in the process carried out at the step S107 indicates that an event has occurred, the flow of the processing goes on to a step S108.

At step S108, the state transition engine 14 produces a result of determination as to whether or not the event information received from the event detection section 19 includes a transition destination. Assuming, for example, that the state information is the one shown in FIG. 3 and the current state is state A. In this case, if the 'A' character key of the keyboard is operated to cause an event to occur, the information on the event will not include a transition destination. Thus, in this case, the flow of the processing goes back to the step S105. That is to say, the operation carried out on the 'A' character key of the keyboard employed in the operation section 11 is handled as a non-event.

If the determination result produced in the process carried out at the step S108 indicates that the event information includes a transition destination, on the other hand, the flow of the processing goes on to a step S109. For example, the state data is the one shown in FIG. 3 and the current state is state A. In this case, if the '0' numerical key of the keyboard employed in the operation section 11 is operated, the operation is handled as an event triggering a transition to state C serving as the transition destination. Thus, the flow of the processing goes on to the step S109 at which the state transition engine 14 sets state C serving as the transition destination as the current state. Then, the flow of the processing goes back to the step S103 to repeat the processes described so far. That is to say, by carrying out the processing described above, as the current state, the state transition engine 14 sets state C serving as the transition destination. Then, the flow of the processing goes back to the step S103 to repeat the processes of this and subsequent steps.

By carrying out the processing described above, the state transition engine 14 is capable of changing the current state to a transition destination specified in the event information received from the event detection section 19 in accordance with a state-transition diagram, reading out state information of the current state, and supplying the state information to the state operation execution section 16. In addition, the state operation execution section 16 is capable of setting a state specified in an operation carried out by the user as the current state and carrying out the operation prescribed in the script information included in the state information of the current state.

Next, processing to generate a state-transition diagram is explained with reference to a flowchart shown in FIG. 12.

As shown in the figure, the flowchart begins with a step S121 at which the state-transition diagram generation section 15 makes an access to the state-data storage section 13 in order to read out all pieces of state data from the state-data storage section 13.

Then, at the next step S122, the state-frame generation section 51 generates a state frame to be placed on the state-transition diagram for each of the pieces of state information and, for each state, describes script information for the state in the state frame of the state.

Subsequently, at the next step S123, the transition generation section 52 generates transitions based on information of transition destination included in the state information and associated with an event.

Then, at the next step S124, the transition generation section 52 searches transitions each caused by a shortcut event on the basis of transition information included in the all pieces of state information.

Subsequently, at the next step S125, the transition generation section 52 changes the display of each shortcut event displayed along with a transition found in the search process to a predetermined display. For example, in the case of the transition 144 caused by a KEY_PRESS (3) shortcut event as shown in FIG. 2, the color of the background of the shortcut event is changed to another color.

Then, at the next step S126, the state-transition diagram generation section 15 generates information composing the state-transition diagram on the basis of the state frames generated by the state-frame generation section 51 and the transitions generated by the transition generation section 52, supplying the generated information to the display control section 17.

By carrying out the processing described above, a state-transition diagram can be generated on the basis of state information stored in the state-data storage section 13 to be supplied to the display control section 17. In addition, for every transition caused by a shortcut event, the shortcut event can be displayed by changing the color of the background of the shortcut-event display to another color. Thus, it is possible to recognize the fact that a software event is replaced by a hardware event designated as a shortcut event.

Next, the display processing is explained with reference to a flowchart shown FIG. 13.

As shown in the figure, the flowchart begins with a step S141 at which the state-transition diagram display control section 61 displays a state-transition diagram display screen 111 based on information received from the state-transition diagram generation section 15.

Then, at the next step S142, on the basis of the information received from the state-transition diagram generation section 15, the state operation display control section 62 produces a result of determination as to whether or not a current state has been specified. If the determination result produced in the process carried out at the step S142 indicates that a current state has been specified, the flow of the processing goes on to a step S143 at which the state operation display control section 62 displays a state-operation display screen 112 on the basis of an operation substance set in the current state as the substance of an operation executed by the state operation execution section 16.

If the determination result produced in the process carried out at the step S142 indicates that a current state has not been specified, on the other hand, the flow of the processing skips the process of the step S143.

By carrying out the processing described above, a display screen 101 including a state-transition diagram display screen 111 and a state-operation display screen 112 can be displayed on the display section 18 as shown in FIG. 2.

Figure 5:
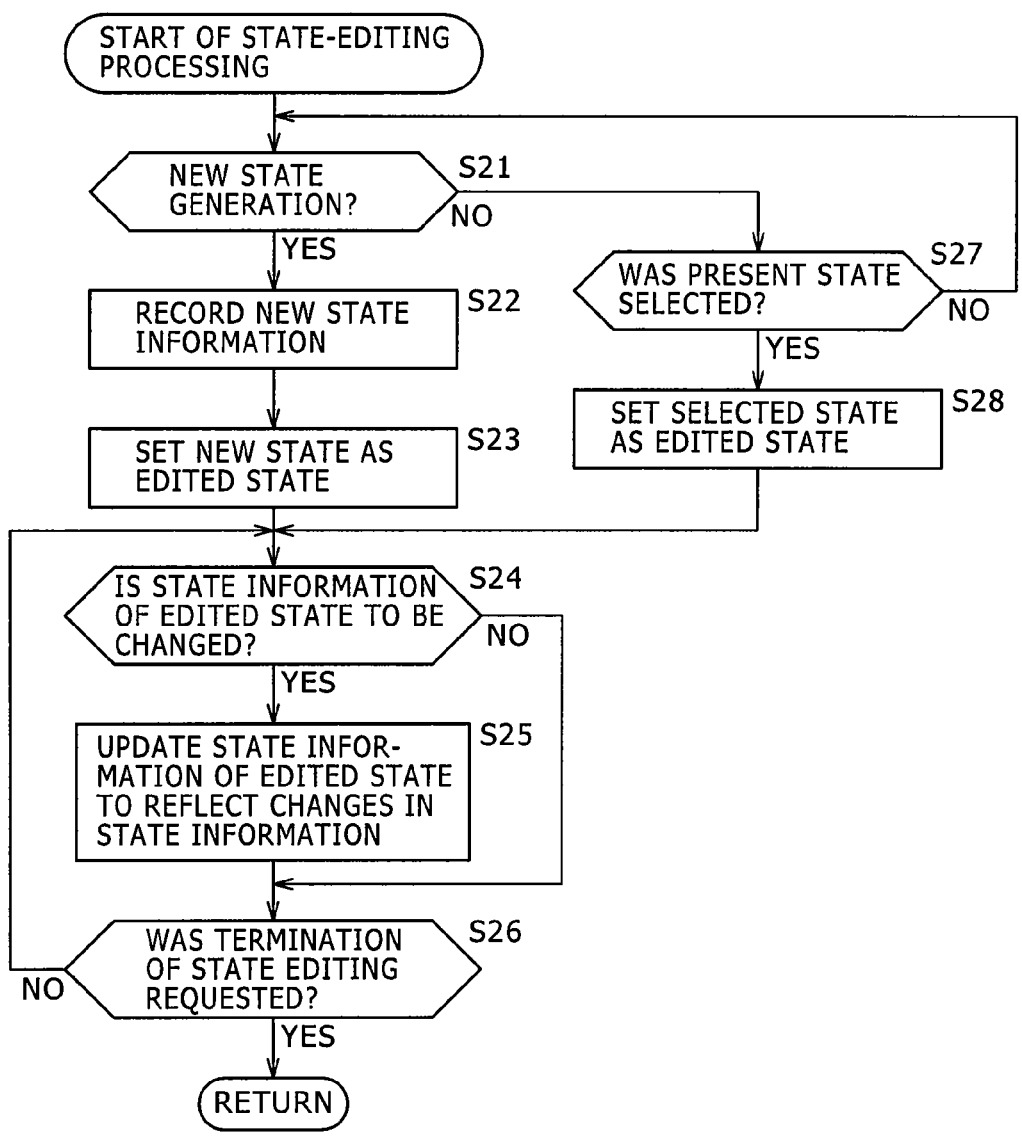
FIG. 5 shows a flowchart referred to in explanation of processing carried out by the state-transition program editing apparatus shown in FIG. 1 to edit a state.
Figure 6:
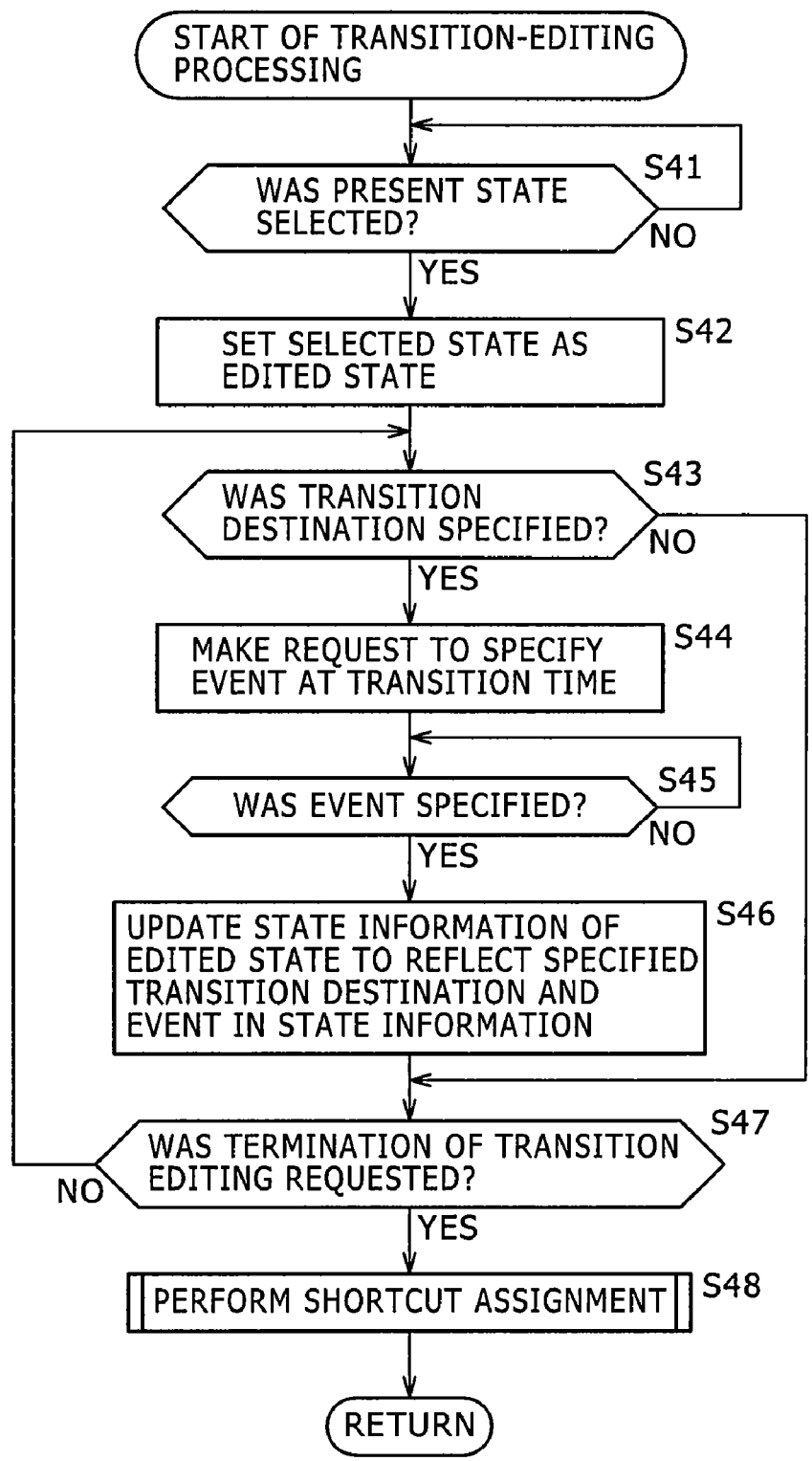
FIG. 6 shows a flowchart referred to in explanation of processing carried out by the state-transition program editing apparatus shown in FIG. 1 to edit a transition.
Figures 9, 10:
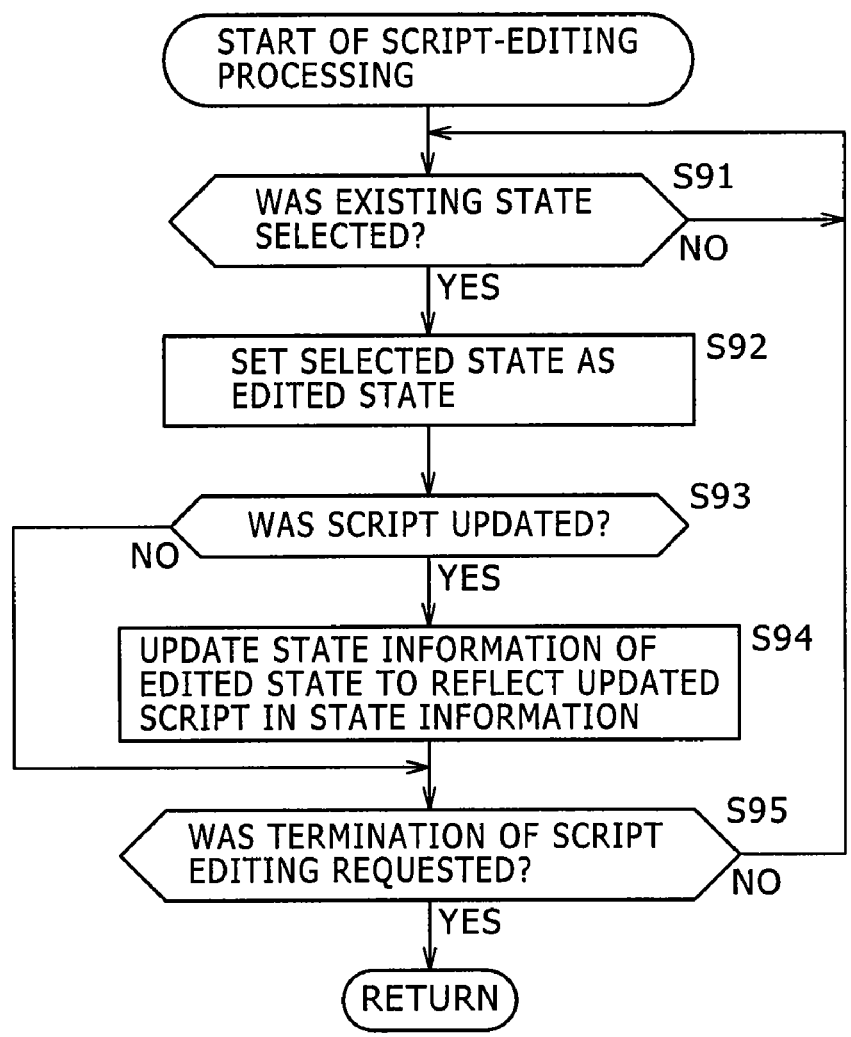
FIG. 9 is a diagram showing a description referred to in describing the processing carried out by the state-transition program editing apparatus shown in FIG. 1 to assign a shortcut event.
FIG. 10 shows a flowchart referred to in explanation of processing carried out by the state-transition program editing apparatus shown in FIG. 1 to edit a script.
Figure 11:
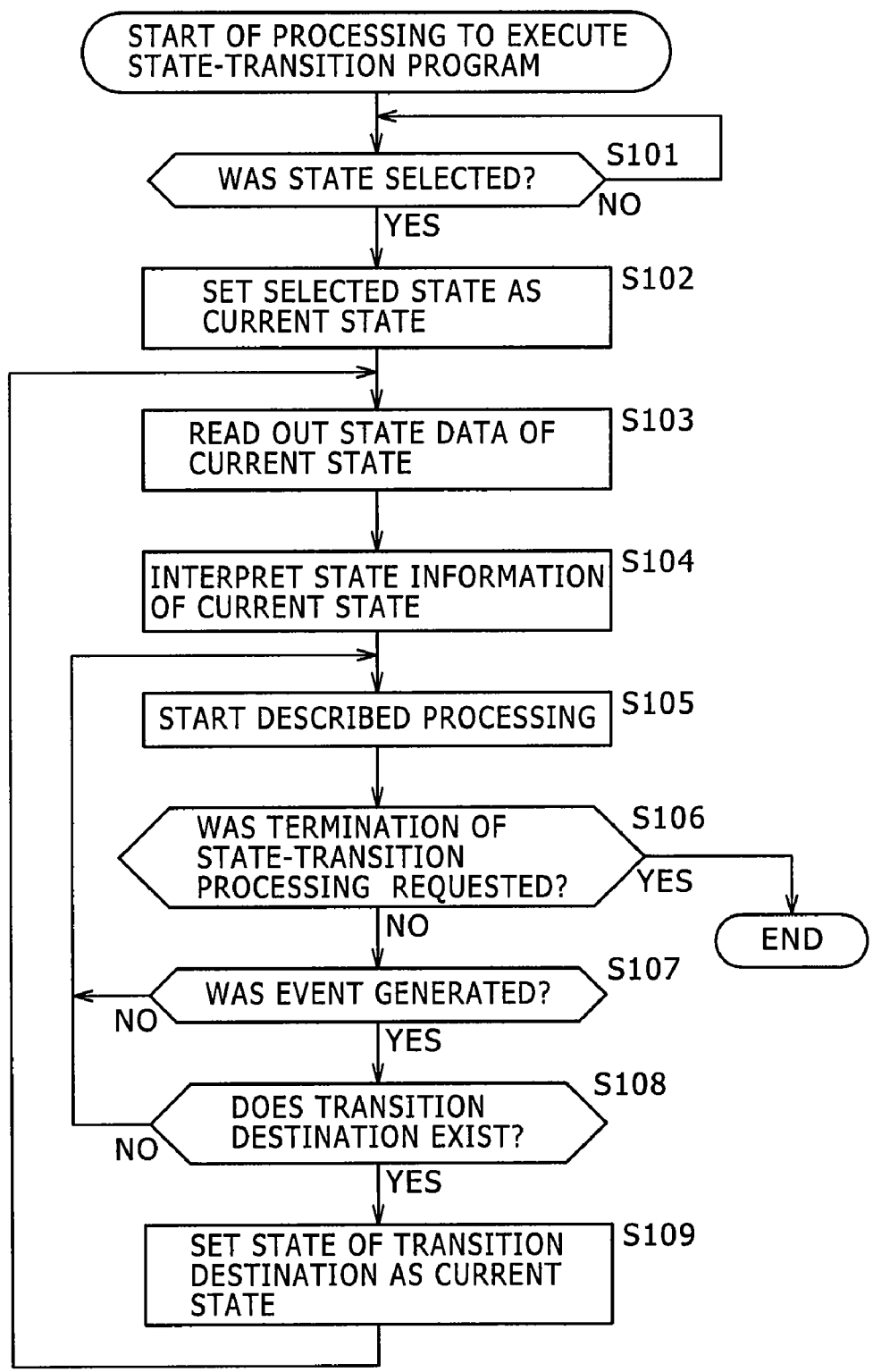
FIG. 11 shows a flowchart referred to in explanation of processing carried out by the state-transition program editing apparatus shown in FIG. 1 to execute the state-transition program.
Figure 12:
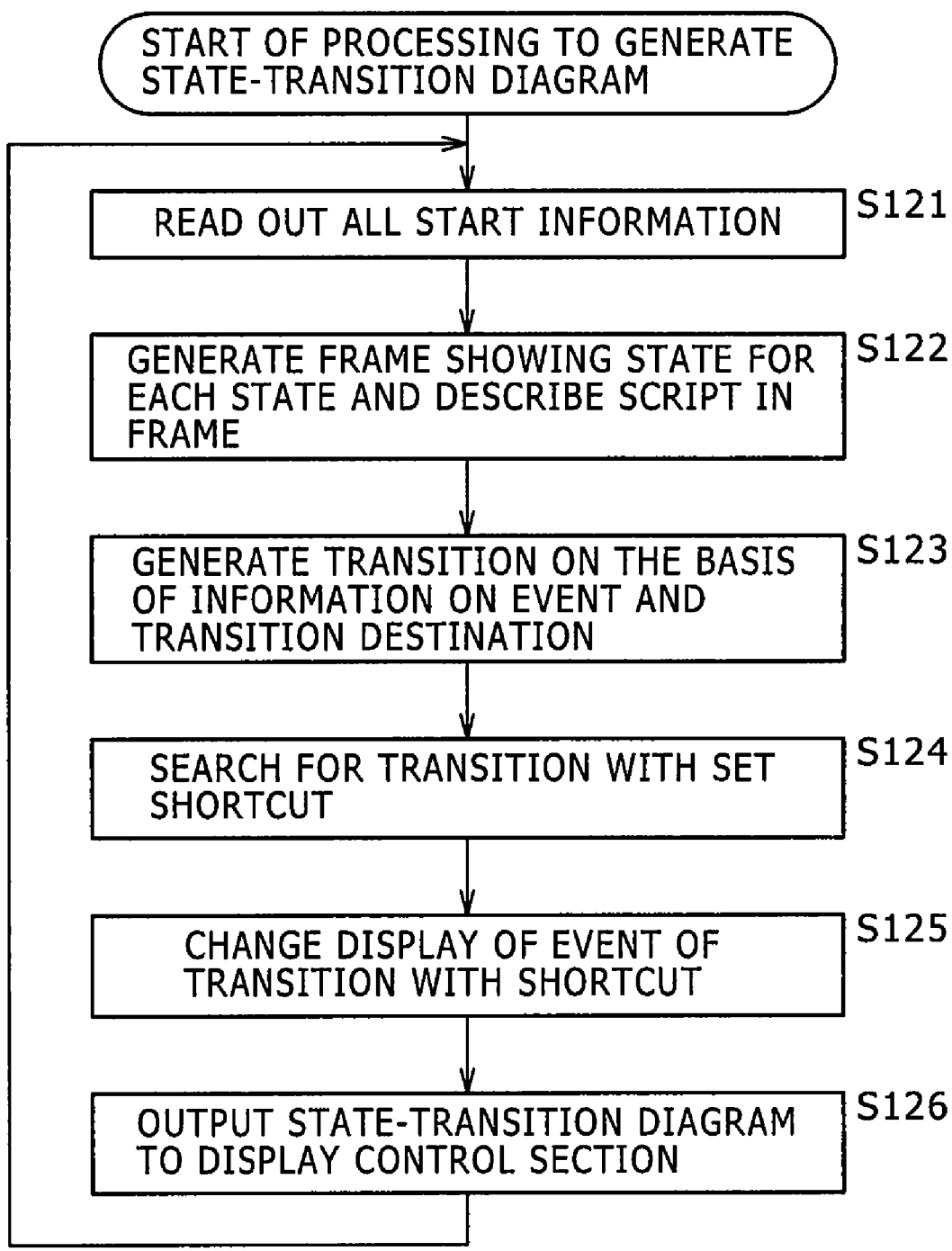
FIG. 12 shows a flowchart referred to in explanation of processing carried out by the state-transition program editing apparatus shown in FIG. 1 to generate a state-transition diagram.

By carrying out the processing to edit a state-transition program in accordance with the flowchart shown in FIG. 4, the processing to edit a state in accordance with the flowchart shown in FIG. 5, the processing to edit a transition in accordance with the flowchart shown in FIG. 6, the processing to edit a script in accordance with the flowchart shown in FIG. 10, the processing to execute the state-transition program in accordance with the flowchart shown in FIG. 11, the processing to generate a state-transition diagram in accordance with the flowchart shown in FIG. 12, and the processing to display screens in accordance with the flowchart shown in FIG. 13, if an event shown on the state-transition diagram is a software event, a hardware event is designated as a shortcut event to be handled in the same way as the hardware event. In addition, since every shortcut event is displayed in a display format different from that of an ordinary hardware event, the shortcut event can be recognized with ease.

The above description explains an example in which different hardware events are each designated as a shortcut event assigned to a software event. In some cases, however, different hardware events may be designated as a shortcut event assigned to the same software event.

Assuming, for example, that the state data stored in the state-data storage section 13 is the data shown in FIG. 3. In this case, the shortcut event assigned to the SWITCH_ON software event in state B is the KEY_PRESS (3) hardware event but the shortcut event for the SWITCH_ON software event in state E is the KEY_PRESS (5) hardware event. In this example, in spite of the same software event, different hardware events are designated as a shortcut event assigned to the same software event in different states. Thus, there is a concern that there is misunderstanding in operating keys of the keyboard. In order to solve this problem, when a plurality of shortcut events are used, it is recommended that the same hardware event be designated as a shortcut event.

That is to say, in processing to specify and assign a shortcut event to a software event, a plurality of shortcut events are implemented by the same hardware event.

Figure 14:
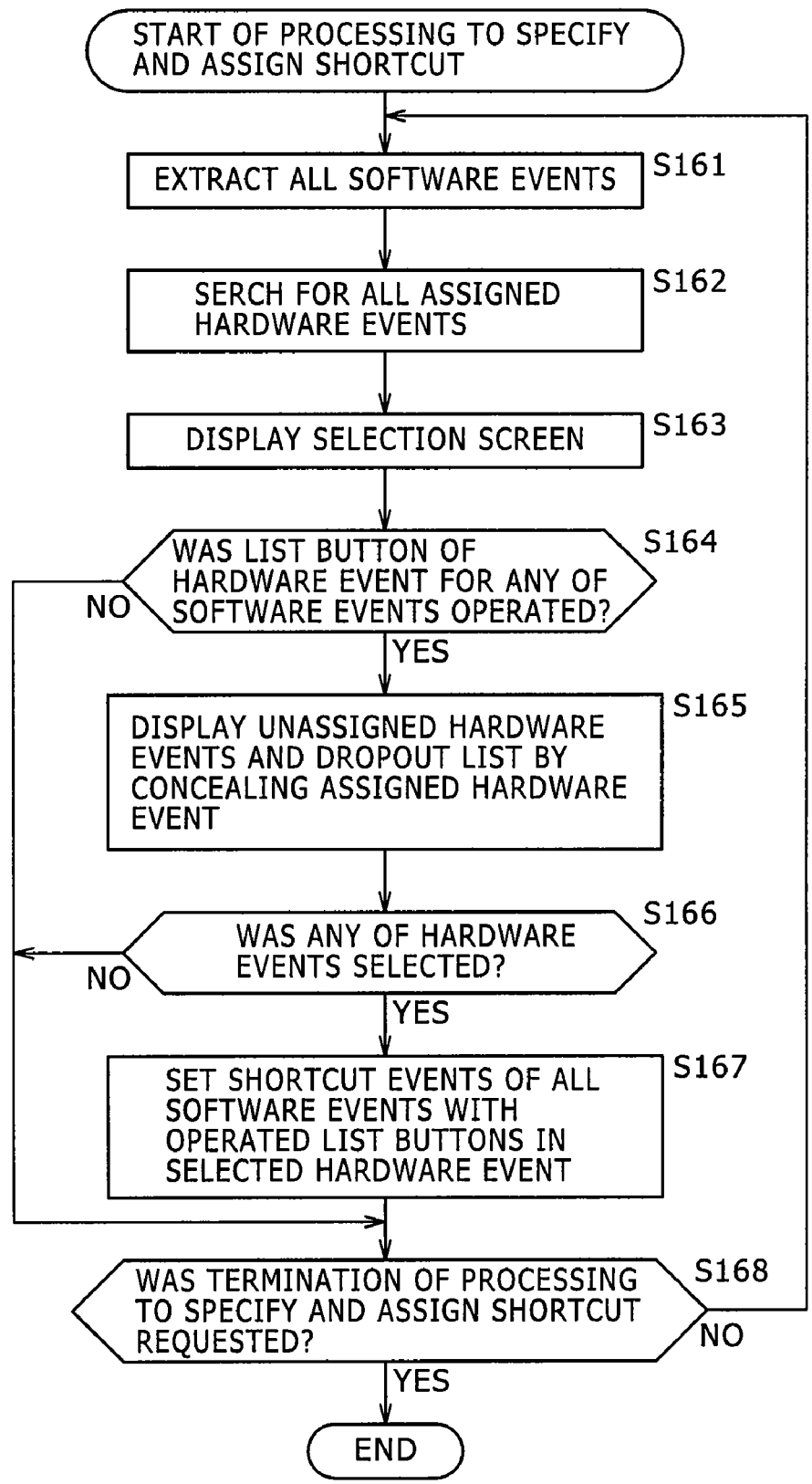
FIG. 14 shows a flowchart referred to in explanation of processing carried out by the state-transition program editing apparatus shown in FIG. 1 to assign a uniform shortcut event.

The processing to specify and assign a shortcut event to a software event is explained with reference to the flowchart shown in FIG. 14 as follows.

As shown in the figure, the flowchart begins with a step S161 at which the specification/assignment section 46 extracts all software events from the state-data storage section 13.

Then, at the next step S162, the specification/assignment section 46 searches for hardware events each already designated as a shortcut event assigned to a software event.

Subsequently, at the next step S163, the specification/assignment section 46 controls the selection-list generation section 47 to display an event selection screen 201 showing a list of all aforementioned software events each to be associated with a hardware event. The list of all aforementioned software events is created on the basis of the software events extracted in the process carried out at the step S161 and the already designated hardware events found in the search process carried out at the step S162.

A typical event selection screen 201 is shown in FIG. 15. As shown in FIG. 15, on the top of the event selection screen 201, a message saying: "Associate events with each other" is displayed. On the left side, a software-event column shows software events 211-1 and 211-2. On the right side of the software events 211-1 and 211-2, selectable hardware-event lists 212-1 and 212-2 are provided respectively. On the right side of the selectable hardware-event lists 212-1 and 212-2, list buttons 213-1 and 213-2 are provided respectively. When a cursor 221 is operated, for example, the selectable hardware-event list 212-1 is shown as a dropdown list.

Then, at the next step S164, the specification/assignment section 46 produces a result of determination as to whether or not a list button 213 provided for a selectable hardware-event list 212 associated with a software event 211 has been pressed. For example, if the result of the determination indicates that the cursor 221 has been operated to press the list button 213-1 as described above, the flow of the processing goes on to a step S165 at which the specification/assignment section 46 displays the selectable hardware-event list 212-1 as a dropdown list. The upper portion of the dropout list shows designated hardware events, and thus is difficult to be selected by concealing the characters. On the other hand, the lower portion of the dropout list shows unassigned hardware events and can thus be assigned as a shortcut event, in ordinary colored characters. In the typical event selection screen 201 shown in FIG. 15, the hatched upper portion on the dropout list is an area showing hardware events each expressed in inversely displayed characters. That is to say, in accordance with the state data shown in FIG. 3, KEY_PRESS (1) to KEY_PRESS (5) hardware events are each concealed thus is difficult to be designated as a shortcut event to be selected to a software event.

Then, at the next step S166, the specification/assignment section 46 produces a result of determination as to whether or not a hardware event has been selected. If the KEY_PRESS (6) hardware event has been selected as indicated by a cursor 221' as shown in FIG. 15, for example, the result of the determination indicates that a hardware event has been selected. In this case, the flow of the processing goes on to a step S167.

At the step S167, the specification/assignment section 46 designates the selected hardware event as a shortcut event to be assigned to the software event 211 associated with the selectable hardware-event list 212.

Then, at the next step S168, the specification/assignment section 46 produces a result of determination as to whether or not termination of the processing to specify and assign a shortcut event to a software event has been requested. If the result of the determination indicates that the termination has not been requested, the flow of the processing goes back to the step S161. If the result of the determination indicates that the termination has been requested, on the other hand, the execution of the processing is ended.

If the determination result produced in the process carried out at the step S164 indicates that no list button 213 provided for a selectable hardware-event list 212 has been pressed by or if the determination result produced in the process carried out at the step S166 indicates that no hardware event has been selected, on the other hand, the flow of the processing goes on to the step S168.

That is to say, by carrying out the processing described above, the KEY_PRESS (6) hardware event specified by the selectable hardware-event list 212-1 shown in FIG. 16 is designated as a shortcut event assigned to the SWITCH_ON software event for all states. In addition, as a result of the processing described above, the specification/assignment section 46 generates a description like one shown in FIG. 17 in order to designate the KEY_PRESS (6) hardware event as a shortcut event assigned to the SWITCH_ON software event. As shown in FIG. 17, the description shown in the figure as a description between <events> on line 1 and <events> on line 6 indicates that the description between lines 1 and 6 describes a shortcut event. Furthermore, an inner description between <mapping> on line 2 and <mapping> on line 5 indicates that the description between lines 2 and 5 describes a hardware event. In addition, <software event>SWITCH_ON</software> described on line 3 indicates that the software event assigned to the shortcut event is a SWITCH_ON software event, which is the event of turning on the switch of the power supply. On the other hand, <hardware event>KET_PRESS (6)</hardware> described on line 4 indicates that the hardware event designated as the shortcut event assigned to the software event is a KEY_PRESS (6) hardware event representing an operation carried out on the '6' numerical key of the keyboard.

Figure 18:
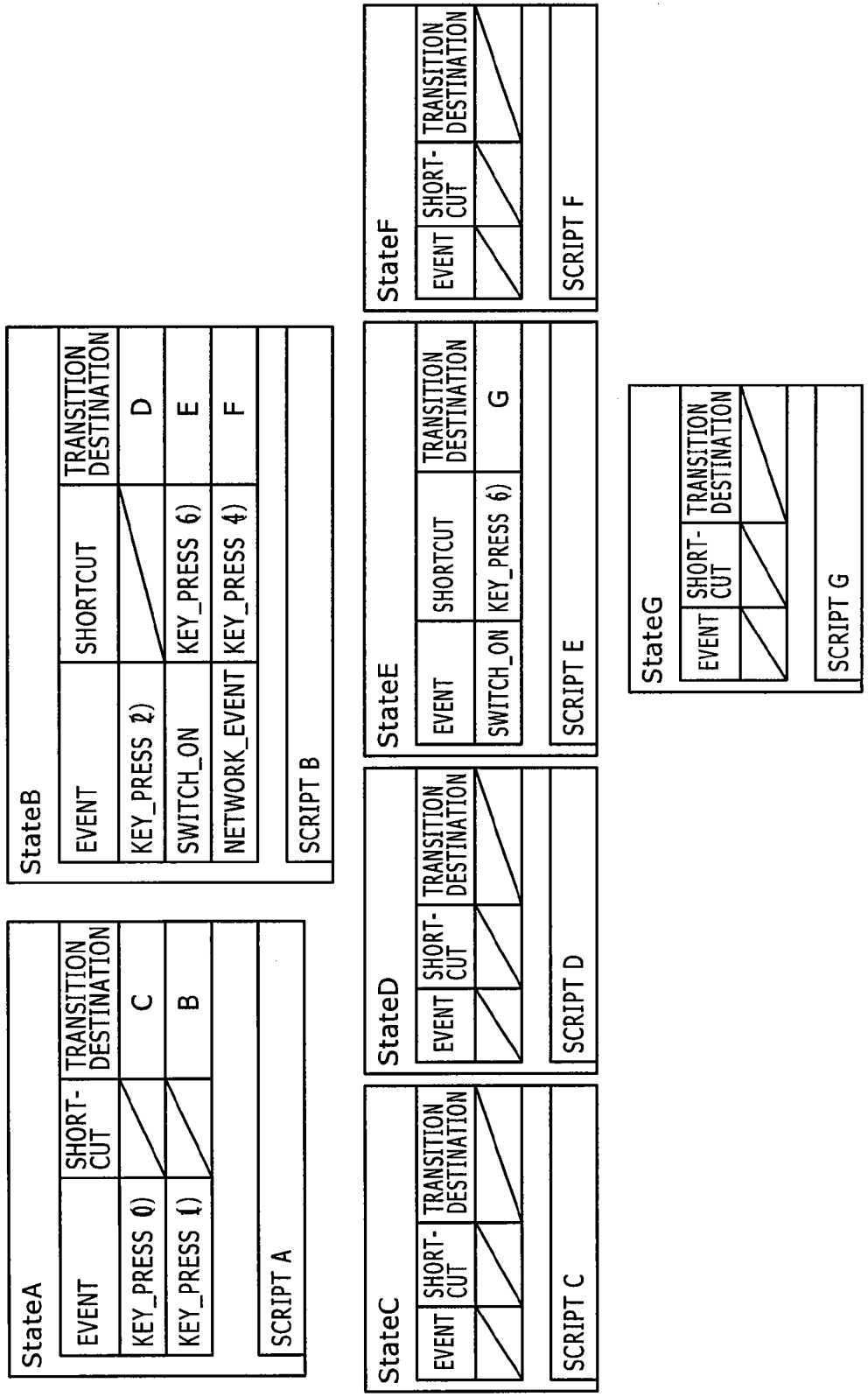
FIG. 18 is a diagram of the structure of state data carried out by the state-transition program editing apparatus shown in FIG. 1 to assign a uniform shortcut event.

The description shown in FIG. 17 designates the KEY_PRESS (6) hardware event as a shortcut event assigned to the SWITCH_ON software event for all states in the state data. In the case of the state data shown in FIG. 18, the states having the SWITCH_ON software event are states B and E.

Figure 19:
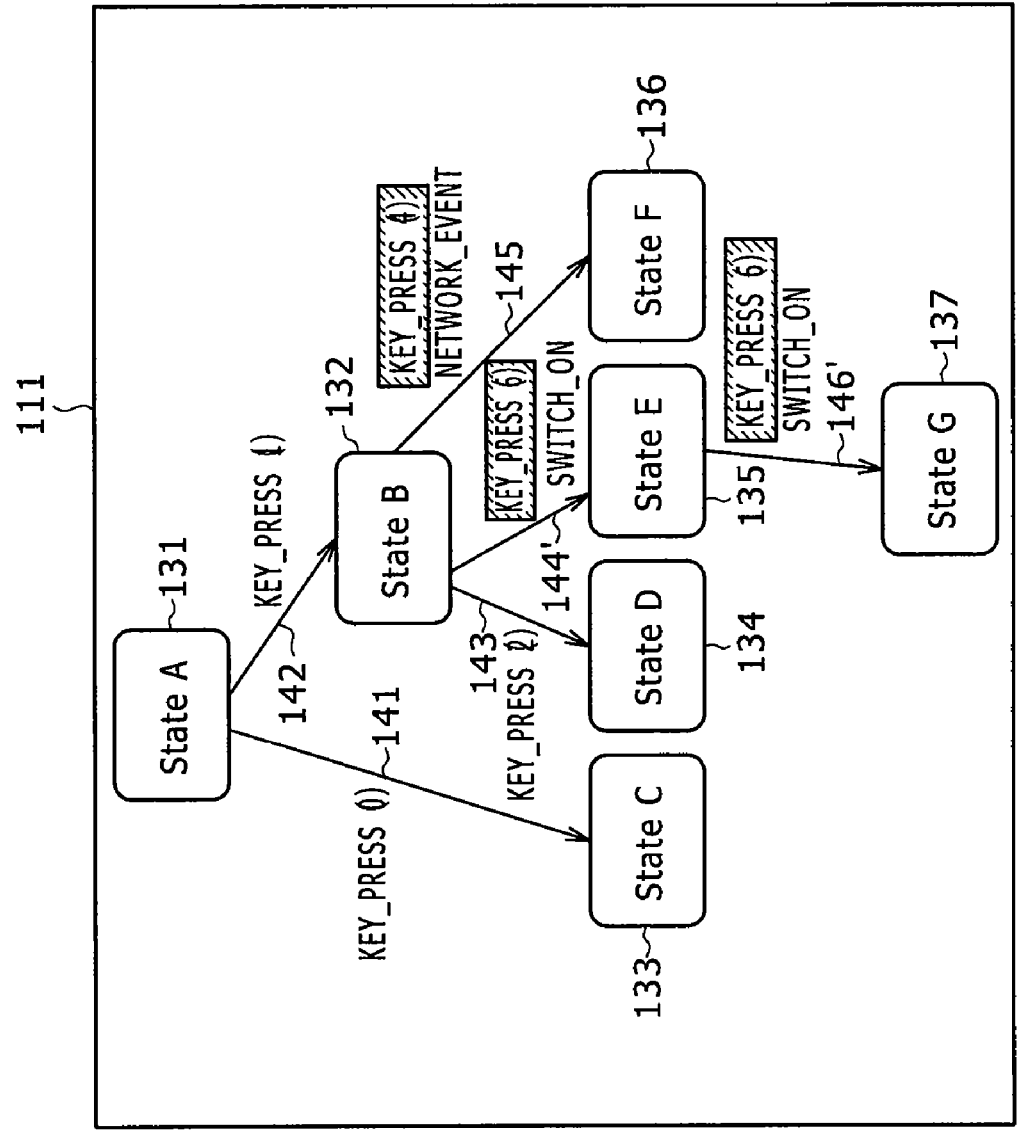
FIG. 19 is a diagram showing a typical configuration of a display displayed by a display section to assign a uniform shortcut event.

As a result, as shown in a state-transition diagram display screen 111 of FIG. 19, the shortcut events assigned to the SWITCH_ON software events associated with transitions 144' and 146' are each displayed as the KEY_PRESS (6) hardware event. Thus, not only is the user capable of carrying out operations along the state-transition diagram be carried out without changing the line of sight, but the same KEY_PRESS (6) hardware event is also designated as a shortcut event assigned to the SWITCH_ON software events associated with a plurality of transitions so that the number of misunderstandings and incorrect operations can be reduced.

According to an embodiment, a software event difficult to assign to a hardware event is recognized as a software event and can also be used in the same sense as a hardware event.

The series of processes described so far can be carried out by hardware and/or execution of software. If the series of processes described so far is to be carried out by execution of software, programs composing the software can be installed into a computer embedded in dedicated hardware, a general-purpose personal computer, or the like from typically a program recording medium. A general-purpose personal computer is a personal computer, which can be made capable of carrying out a variety of functions by installing a variety of programs into the personal computer.

Figure 20:
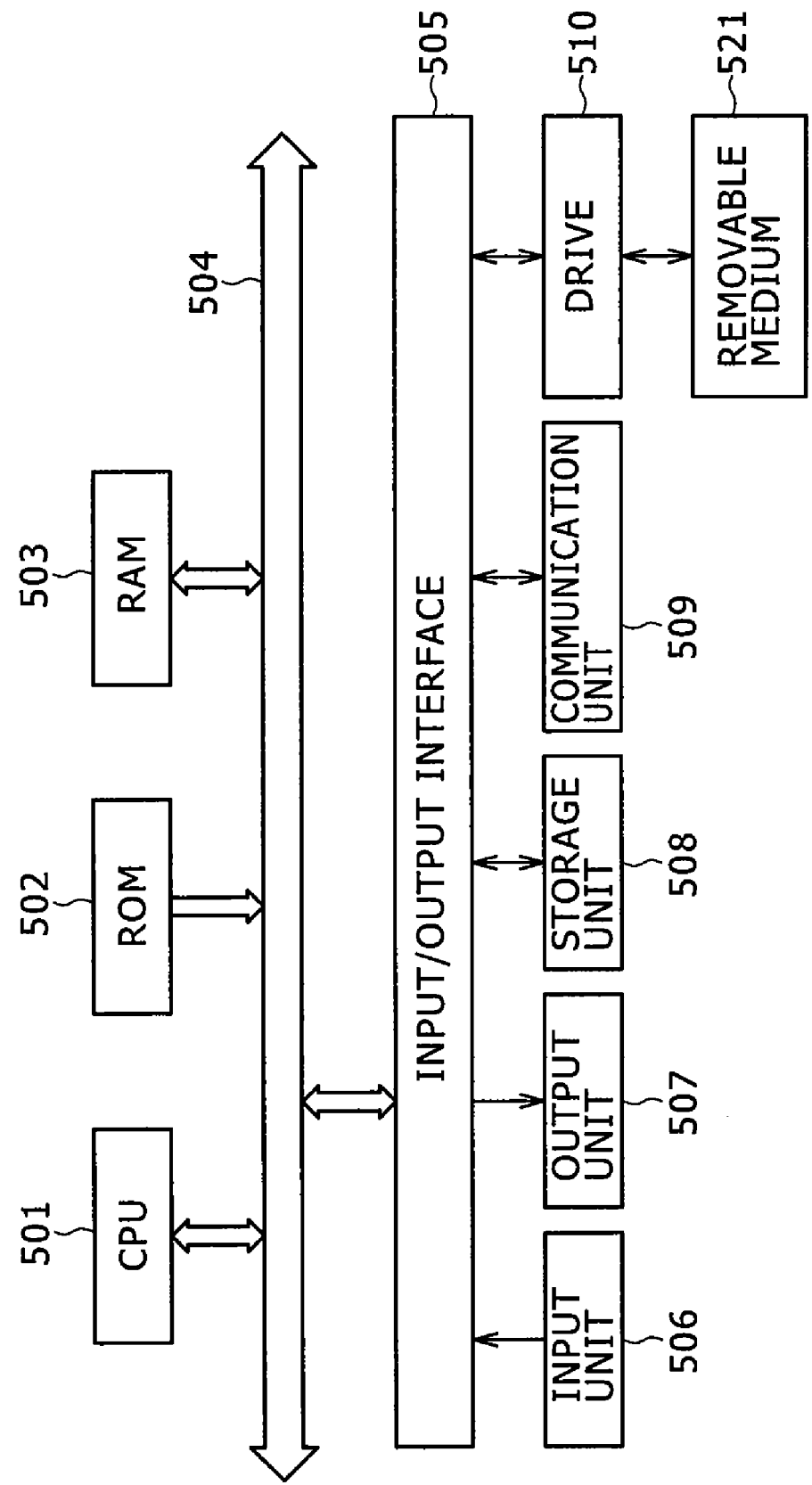
FIG. 20 is a block diagram for explaining a medium.

FIG. 20 is a diagram showing the configuration of an embodiment implementing a personal computer for executing the software in order to implement the electrical internal configuration of the state-transition program editing apparatus 1 shown in FIG. 1. As shown in FIG. 20, the personal computer includes a CPU 501, a ROM (Read Only Memory) 502, a RAM (Random Access Memory) 503, a bus 504, an input/output interface 505, an input unit 506, an output unit 507, a storage unit 508, a communication unit 509, a drive 510 and a CPU 501. The CPU 501 is a unit for controlling all operations carried out by the personal computer. The CPU 501 also executes a program stored in the ROM 502 in advance in accordance with a command entered via the input unit 506, which is connected to the CPU 501 by the input/output interface 505 and the bus 504. As an alternative, the CPU 501 reads out a program from the removable medium 521 serving as the program recording medium cited above and installs the program in the storage unit 508. Then, the program is loaded from the storage unit 508 to the RAM 503 to be executed by the CPU 501. The removable medium 521 mounted on the drive 510 can be a magnetic disk, an optical disk, a magneto-optical disk, or a semiconductor memory. In this way, functions of the state-transition program editing apparatus 1 shown in FIG. 1 can be implemented by execution of software. In addition, the CPU 501 controls the communication unit 509 to communicate with an external apparatus in order to exchange data with the apparatus.

As described above, programs to be executed by the computer are installed from the program recording medium, which is referred to as the removable recording medium 521 shown in FIG. 20. Examples of the removable recording medium also referred to as a package medium include the magnetic disk such as a flexible disk, the optical disk such as a CD-ROM (Compact Disk—Read Only Memory) or a DVD (Digital Versatile Disk), the magneto-optical disk such as the semiconductor memory as explained above. Instead of installing the programs from the removable recording mediums, the programs can also be stored temporarily or permanently in an embedded recording medium included in the main unit of the computer. Examples of the embedded recording medium are a hard disk included in the storage section 508 and the ROM 502. If necessary, the programs can also be installed into the computer from a source connected to a wire or radio communication media such as a local area network, the Internet, or a digital broadcasting satellite through the communication unit 509, which serves as a communication interface with the communication media. Examples of the communication interface are a router or a modem.

It is to be noted that, as the CPU 501, the computer may employ a cell, which is explained in a report with a title of "The Birth of a Cell" in Nikkei Electronics, a publication of Nikkei BP Corporation, Feb. 28, 2005, pages 89 to 117.

It is also worth noting that, in this specification, steps of every flowchart described above can be carried out not only in a pre-prescribed order along the time axis, but also concurrently or individually.

It is to be noted that the embodiment described above is not the only embodiment of the present invention. That is to say, a variety of changes can be made to the embodiment as changes within a range not deviating from the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information-processing method usable with an information-processing apparatus for editing state-transition information, the method comprising:
    searching, by a processor, for a hardware event not yet assigned as any one of a plurality of events;
    if said plurality of events include a software event, assigning, by the processor, said hardware event found in a search process carried out at said searching step as a shortcut event based on a table showing a combination of said hardware event to said software event, wherein said shown combination takes precedent over other combination;
    generating, by the processor, a state-transition diagram on the basis of said state-transition information, said state-transition diagram including information on the operation in each of a plurality of states, information on said plurality of events each potentially occurring in each specific one of said plurality of states to result in a transition, and information on transition directions each indicating the direction of a transition caused by each of said plurality of events potentially occurring in said plurality of states;
    and displaying said state-transition diagram on a display screen.

2. The information-processing method according to claim 1, wherein assigning said hardware event includes assigning a keyboard-key operation, selected among found hardware events, as a shortcut event where said keyboard-key operation takes precedence over other hardware events.

3. The information-processing method according to claim 2, wherein assigning said hardware event includes assigning a specific-keyboard-key, which is close to a keyboard-key assigned to a found hardware event, as a shortcut event where said specific-keyboard-key takes precedence over said other keyboard-key 4. The information-processing method according to claim 1, wherein assigning said hardware event includes assigning a specific-keyboard-key, which is separated away from a keyboard-key assigned to a found hardware event, as a shortcut event where said specific-keyboard-key takes precedence over other keyboard-key.

5. The information-processing method according to claim 1, wherein said assigned shortcut event resulting in a transition is displayed as a shortcut event associated with said transition by a display method different from display methods of other events.

6. An information-processing apparatus for editing state-transition information, the apparatus comprising:
    means for searching for a hardware event not yet assigned as any one of a plurality of events;
    means for assigning said hardware event found in a search process carried out at said searching step as a shortcut event based on a table showing a combination of said hardware event to a software event, wherein said shown combination takes precedent over other combinations, wherein said assignment occurs if said plurality of events include said software event;
    means for generating a state-transition diagram on the basis of said state-transition information, said state-transition diagram including information on the operation in each of a plurality of states, information on said plurality of events each potentially occurring in each specific one of said plurality of states to result in a transition, and information on transition directions each indicating the direction of a transition caused by each of said plurality of events potentially occurring in said plurality of states; and means for displaying said state-transition diagram on a display screen.

7. A recording medium used for recording a program, which can be read from said recording medium for execution by a processor for controlling an information-processing apparatus for editing state-transition information, the program comprising the steps of:

searching for a hardware event not yet assigned as any one of a plurality of events;

if said plurality of event include a software event, assigning said hardware event found in a search process carried out at said searching step as a shortcut event based on a table showing a combination of said hardware event to said software event, wherein said shown combination takes precedent over other combinations;

generating a state-transition diagram on the basis of said state-transition information, said state-transition diagram including information on the operation in each of a plurality of states, information on said plurality of events each potentially occurring in each specific one of said plurality of states to result in a transition, and information on transition directions each indicating the direction of a transition caused by each of said plurality of events potentially occurring in said plurality of states; and displaying said state-transition diagram on a display screen.

8. A program executed by a processor for controlling an information-processing apparatus for editing state-transition information, the program comprising the steps of:

searching for a hardware event not yet assigned as any one of a plurality of events;

if said plurality of events include a software event, assigning said hardware event found in a search process carried out at said searching step as a shortcut event based on a table showing a combination of said hardware event to said software event, wherein said shown combination takes precedent over other combinations;

generating a state-transition diagram on the basis of said state-transition information, said state-transition diagram including information on the operation in each of a plurality of states, information on said plurality of events each potentially occurring in each specific one of said plurality of states to result in a transition, and information on transition directions each indicating the direction of a transition caused by each of said plurality of events potentially occurring in said plurality of states; and displaying said state-transition diagram on a display screen.

9. An information-processing apparatus for editing state-transition information, the apparatus comprising:

a processor configured to:
(a) search for a hardware event not yet assigned as any one of a plurality of events;
(b) designate said hardware event found in a search process carried out by said search as a shortcut event based on a table showing a combination of said hardware event to a software event, wherein said shown combination takes precedent over other combinations, wherein said designation occurs if said plurality of events include said software event; and
(c) generate a state-transition diagram on the basis of said state-transition information, said state-transition diagram including information on the operation in each of a plurality of states, information on said plurality of events each potentially occurring in each specific one of said plurality of states to result in a transition, and information on transition directions each indicating the direction of a transition caused by each of said plurality of events potentially occurring in said plurality of states; and a display section for displaying said state-transition diagram on a display screen.

* * * * *